Sept. 15, 1942.  J. C. McCUNE ET AL  2,295,797
BRAKE MECHANISM
Filed Sept. 17, 1940    6 Sheets-Sheet 1

INVENTORS
JOSEPH C. McCUNE
GEORGE K. NEWELL
BY
*A. M. Higgins*
ATTORNEY

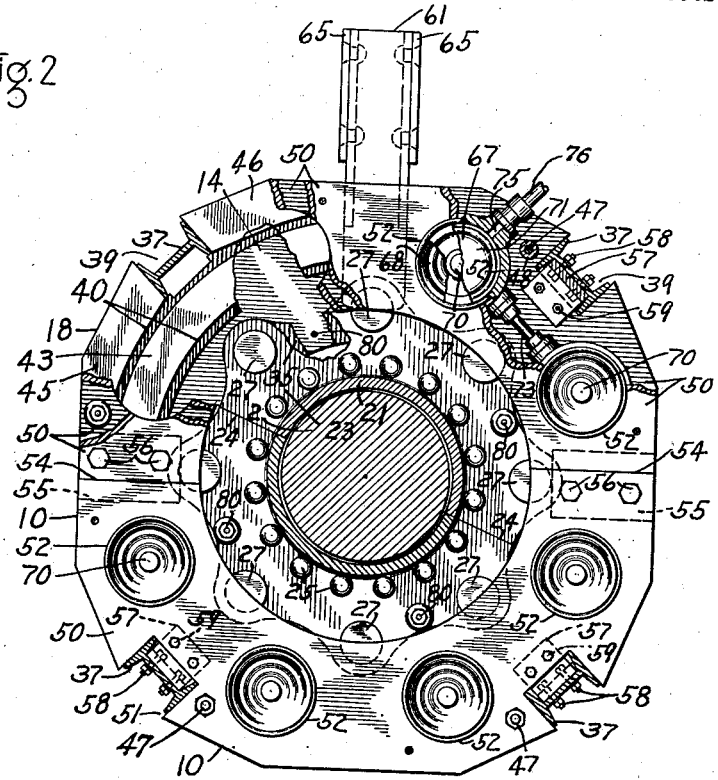

Sept. 15, 1942.  J. C. McCUNE ET AL  2,295,797
BRAKE MECHANISM
Filed Sept. 17, 1940  6 Sheets-Sheet 3
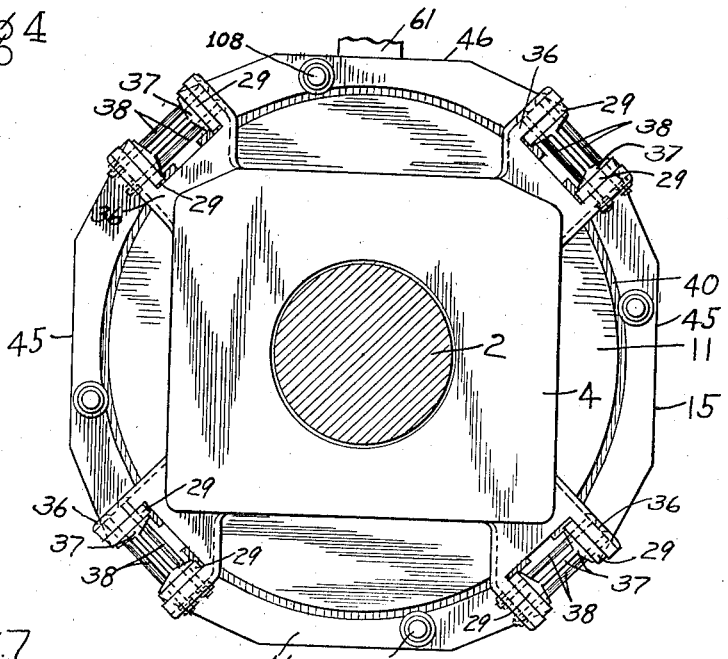
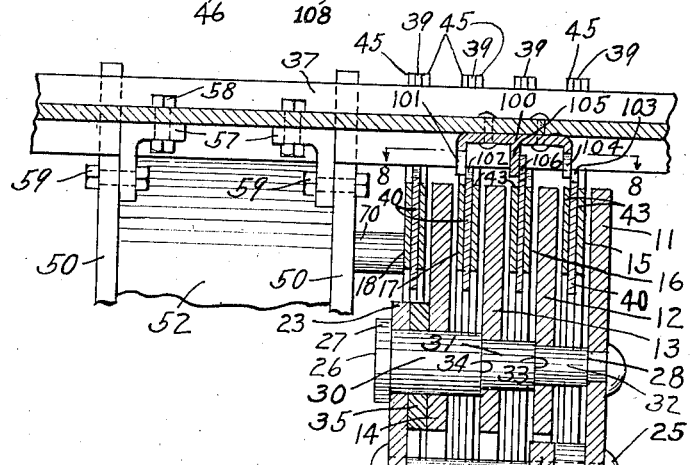
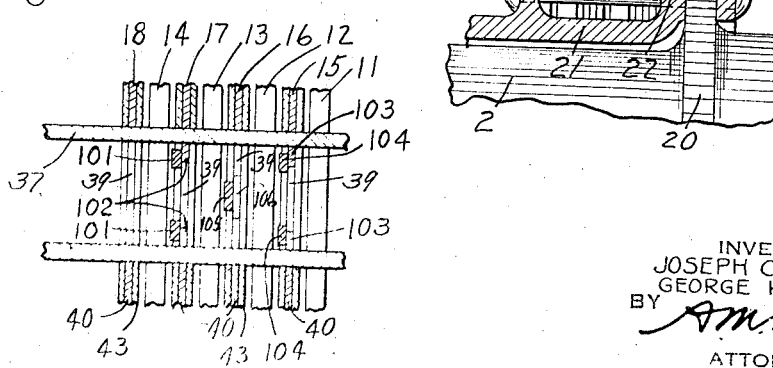
INVENTORS
JOSEPH C. McCUNE
GEORGE K. NEWELL
BY
A. M. Higgins
ATTORNEY

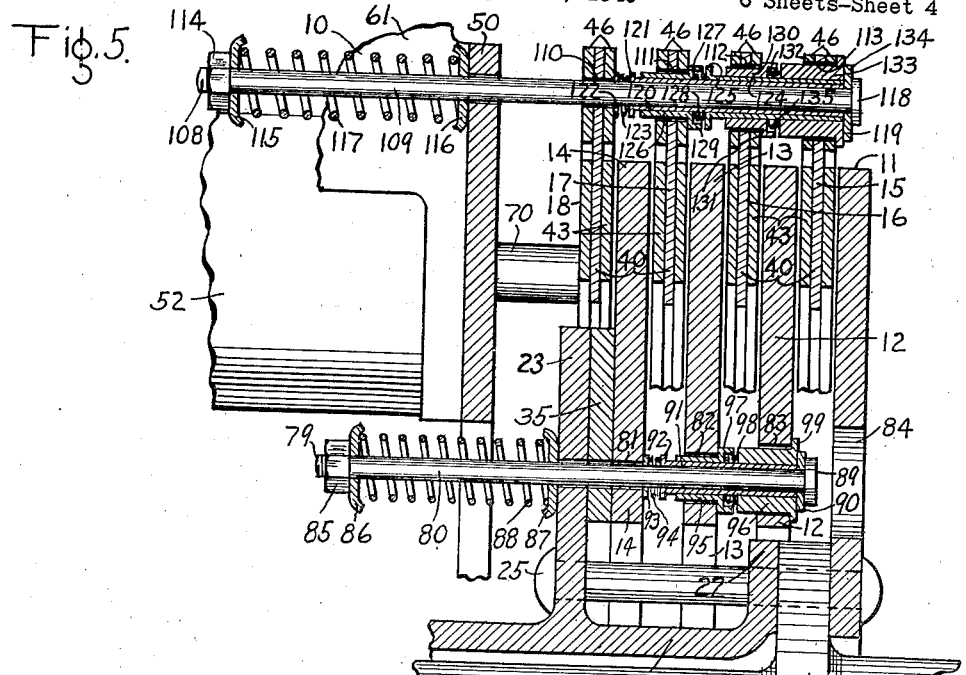
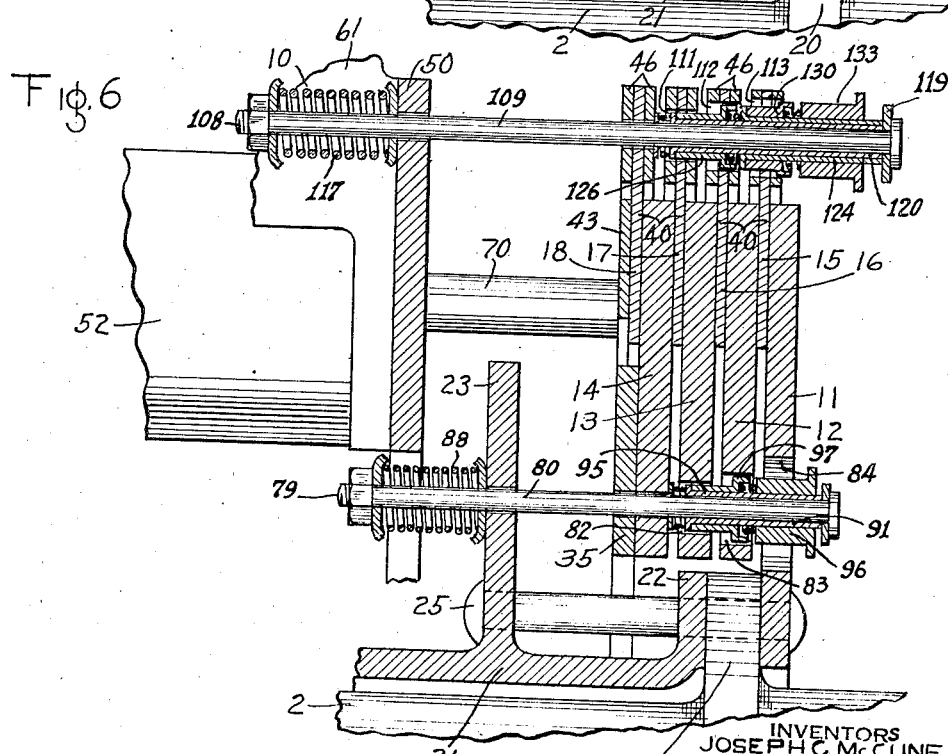

Sept. 15, 1942.   J. C. McCUNE ET AL   2,295,797
BRAKE MECHANISM
Filed Sept. 17, 1940   6 Sheets-Sheet 5
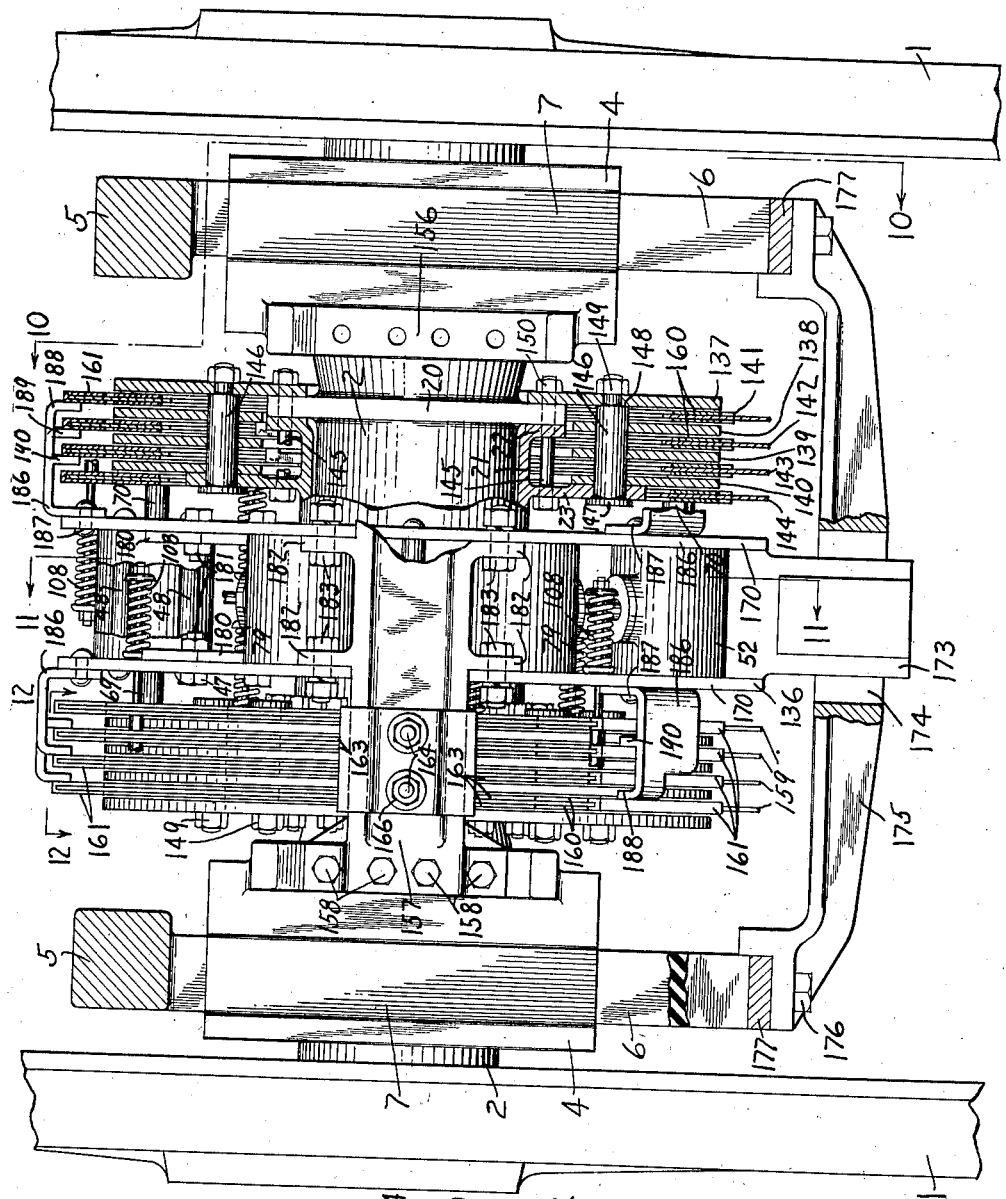
INVENTORS
JOSEPH C. McCUNE
GEORGE K. NEWELL
BY 
ATTORNEY

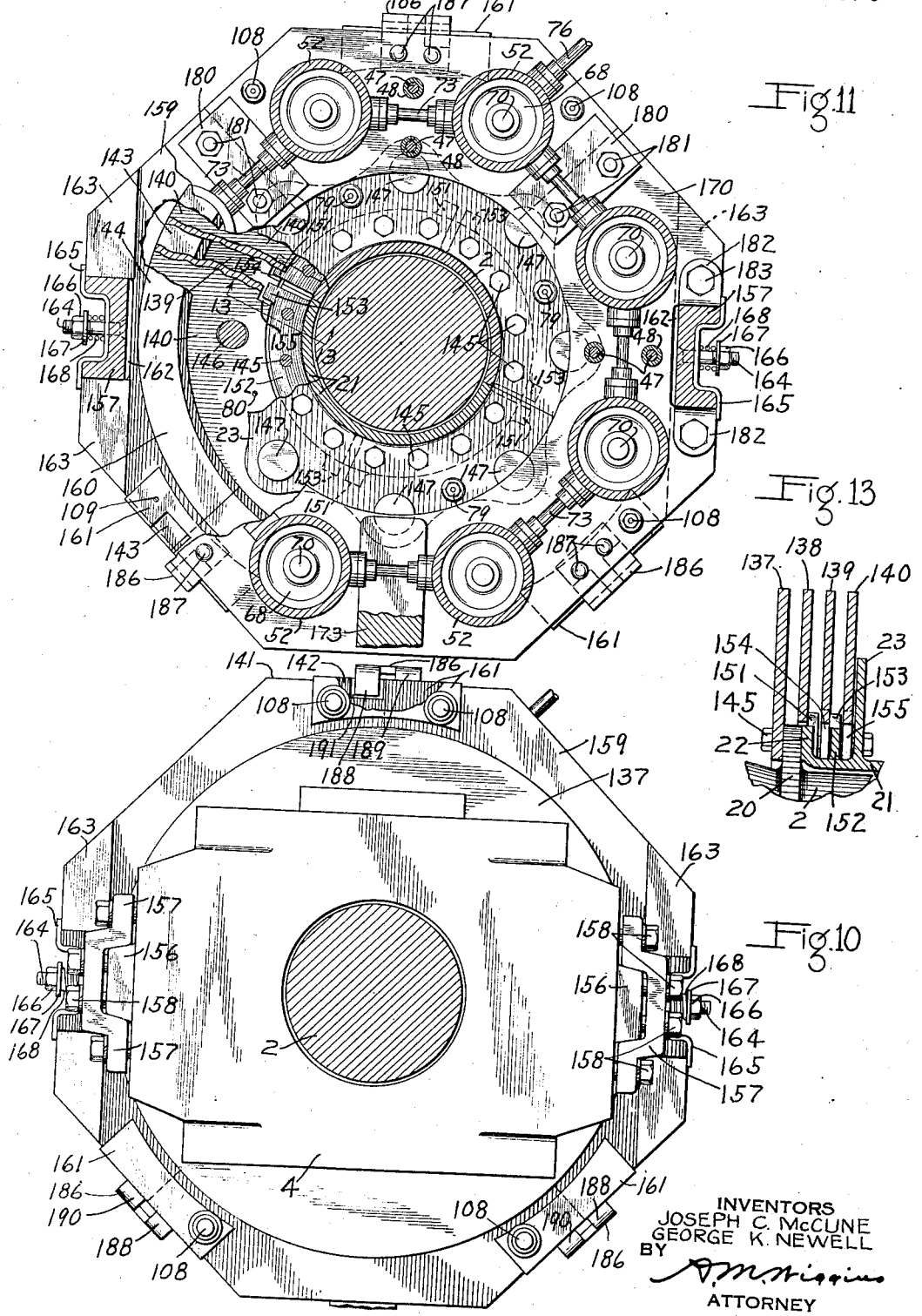

Patented Sept. 15, 1942

2,295,797

UNITED STATES PATENT OFFICE 2,295,797

BRAKE MECHANISM

Joseph C. McCune, Edgewood, and George K. Newell, near Pitcairn, Pa., assignors to The Westinghouse Air Brake Company, Wilmerding, Pa., a corporation of Pennsylvania Application September 17, 1940, Serial No. 357,134

40 Claims. (Cl. 188—153)

This invention relates to brake mechanisms and more particularly to the disk type primarily adapted for use on railway vehicles and embodying annular rotatable and non-rotatable friction disks adapted to be moved into frictional interengagement for braking the wheels of the vehicle.

One object of the invention is to provide a novel disk brake mechanism of this type.

Another object of the invention is to provide an improved disk brake mechanism which though not limited in use is particularly adapted to be associated with the driving wheels of locomotives for braking same.

Other objects and advantages will appear in the following more detailed description of the invention.

In the accompanying drawings; Fig. 1 is a vertical view, partly in elevation and partly in section, of a pair of locomotive driver wheels and the improved brake mechanism associated therewith; Figs. 2 to 4 are sectional views taken respectively on the lines 2—2, 3—3 and 4—4 in Fig. 1; Fig. 5 is a sectional view taken on the line 5—5 in Fig. 3; Fig. 6 is a view similar to Fig. 5 but showing certain parts in different positions; Fig. 7 is a sectional view taken on the line 7—7 in Fig. 3; Fig. 8 is a sectional view taken on the line 8—8 in Fig. 7; Fig. 9 is a view similar to Fig. 1 showing another embodiment of the invention; Figs. 10, 11 and 12 are sectional views taken respectively on the lines 10—10, 11—11 and 12—12 in Fig. 9; and Fig. 13 is a sectional view taken on the line 13—13 in Fig. 11.

General description

In the drawings the reference numerals 1 indicate the two wheels of a driver wheel and axle assembly of a locomotive; the reference numeral 2 indicating the axle connecting the two wheels 1 in the usual spaced relation for rolling on rails 3. The wheels 1 are secured to the opposite ends of axle 2 in any desired manner, such as by shrinking, so that said wheels and axle will turn together.

Mounted on axle 2 between the wheels 1 and adjacent each of said wheels is a journal box 4, the two journal boxes being provided for carrying the locomotive frame side members 5. Each of the side members 5 is disposed about one of the journal boxes 4 and is provided with depending pedestal legs 6 which are spaced apart and adapted to slide in slots 7 provided in the opposite sides of the journal box. The lower ends of each pair of pedestal legs 6 are connected together together below the respective journal box by the usual pedestal cap 8.

The detail construction of the locomotive parts above described and shown in the drawings are so well known that a further description and a more complete showing thereof are not deemed essential to a clear and comprehensive understanding of the present invention which will now be described.

Description of embodiment shown in Figs. 1 to 8

Figure 1:
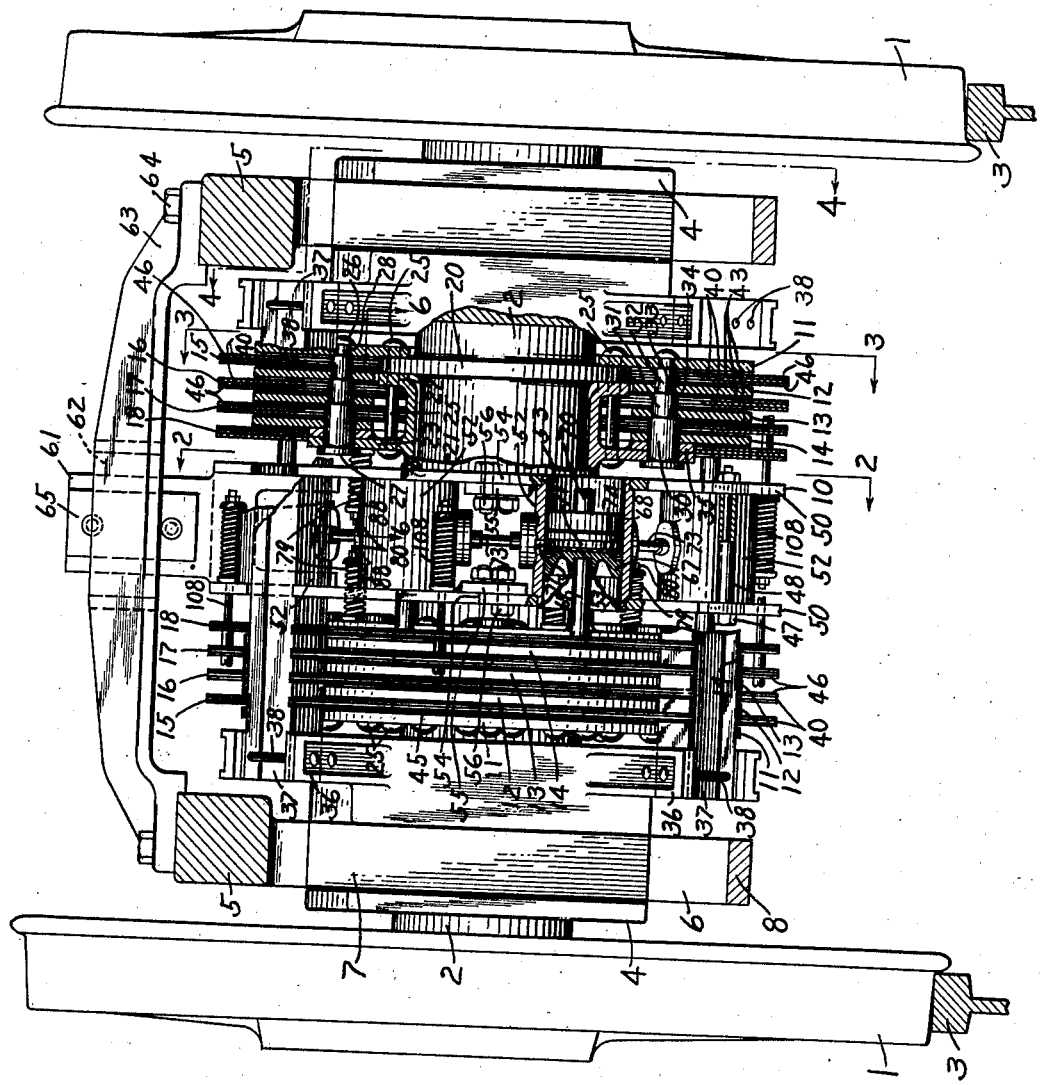

As shown in the drawings, this embodiment of the invention is adapted to be mounted around the axle 2 between the journal boxes 4 with the various annular parts of the brake mechanism arranged in coaxial relation with said axle and the driver wheels 1.

Briefly, the improved brake mechanism comprises an annular double acting brake cylinder device 10 arranged substantially midway between the journal boxes 4, and at each side of said brake cylinder device there is provided a pile of interleaved annular rotatable braking disks 11, 12, 13 and 14 which are secured to rotate with the wheel and axle assembly and annular non-rotatable braking disks 15, 16, 17 and 18 which are secured against rotation. The brake cylinder device 10 is adapted to be operated by fluid under pressure for moving the pile of braking disks at both sides thereof into frictional interengagement to effect braking of the locomotive wheels 1. Upon the release of fluid under pressure from the brake cylinder device 10, release means to be hereinafter described are adapted to operate to move the brake elements in the two piles out of frictional interengagement so that the locomotive wheels 1 will be free to rotate.

Now in greater detail, the axle 2 is provided adjacent the inside face of each of the journal boxes 4 with an annular outstanding collar 20, and encircling the axle between the two collars 20 and engaging the adjacent faces thereof is a sleeve 21. This sleeve is preferably spaced from the axle in concentric relation therewith and at each of its opposite ends there is an annular collar 22 which bears against the inside face of the adjacent collar 20 on the axle 2. The sleeve 21 also has two annular flanges 23 of greater diameter than the collars 22 and each of said flanges is spaced from one of said collars a chosen distance for reasons which will be later apparent. The sleeve 21 is preferably made in two complementary parts for application around the axle 21 and these two parts are then preferably welded together along their lines of contact, particularly in the collars 22 and flanges 23, this two part structure being clearly shown in Fig. 2 wherein the reference numerals 24 indicate the lines of contact between the two parts of one collar 23 at opposite sides of the axle 2 along which lines the welding of the two parts together is preferably effected.

The rotatable braking disk 11 at the outer end of each pile of brake elements is mounted against the outer face of one of the axle collars 20 and is rigidly secured in this position by a plurality of rivets 25 extending through said element and collar and through the adjacent flanges 22 and 23 of sleeve 21, said rivets being equally spaced from each other around the axle.

Arranged around the axle 2 at a greater distance therefrom than rivets 25 are a plurality of rigid torque bolts or elements 26 which are equally spaced from each other and which extend through and provide a rigid connection between each of the rotatable brake elements 11 and the adjacent flange 23 extending from the sleeve 21. Each of the bolts 26 has at its inner end a head 27 bearing against the outer face of flange 23 while the opposite end is riveted over against the opposite face of the rotatable brake element 11, each of the bolts being provided with a shoulder 28 adjacent the riveted end but engaging the opposite face of the rotatable brake element 11 to rigidly secure said element against axial movement.

Each of the torque bolts 26 is provided with three cylindrical guide portions 30, 31 and 32, the guide portion 30 of greatest diameter being located adjacent the bolt head 27 while the guide portion 32 of smallest diameter is located adjacent the rotatable brake element 11. In each pile of brake elements the rotatable brake element 14 is slidably mounted on the guide portions 30 of the torque bolts 26, the rotatable brake element 13 is slidably mounted on the guide portions 31, while the rotatable brake element 12 is slidably mounted on the guide portions 32.

At the junction of the guide portions 31 and 32 on the torque bolts in each pile of brake elements there is provided a stop shoulder 33 for engagement by the rotatable brake element 12 to limit movement thereof in the direction of the brake cylinder device 10 and to thereby define its brake release position. At the junction of the cylindrical portions 30 and 31 of the torque bolts in each pile of brake elements a stop shoulder 34 is provided for engagement by the rotatable brake element 13 to limit movement thereof in the direction of the brake cylinder device 10 and to define its brake release position. Between the rotatable brake element 14 and the collar 23 extending from the sleeve 21 in each of the pile of brake elements is a ring 35 which is welded to said element for movement therewith. Engagement of the ring 35 with collar 23 is adapted to define the brake release position of the brake element 14, while said ring is adapted under a maximum wear condition of the brake mechanism to remain on the cylindrical guide portions 30 of the torque bolts 26 to provide a driving connection between said bolts and said element, which condition will be brought out in greater detail hereinafter.

The openings through ring 35 and through the rotatable brake elements 12, 13 and 14 in which the torque bolts 26 are disposed are somewhat elongated in the direction radially of the elements in order to permit the elements to expand and contract when alternately subjected to heating and cooling during braking. These openings, as measured circumferentially of the elements, are of substantially the same width as the portion of the bolts 26 engaged thereby in order to minimize lost motion between the elements and axle in a circumferential direction.

From the above description it will be apparent that the several rotatable brake elements 11 to 14 are rigidly secured through the torque bolts 26 and sleeve 21 to the axle 2 so as to rotate with the axle and thereby with the locomotive wheels 1, the rotatable brake element 11 being rigidly secured against axial movement while the other rotatable brake elements are capable of axial movement.

The rotatable brake elements 12, 13 and 14 are all preferably made in one piece with an internal diameter slightly greater than that of the collars 22 on sleeve 21 and the flanges 20 on the axle so as to permit mounting said elements in place over said flange and collar after the sleeve 21 is secured in place and before the wheels 1 and journal boxes are applied to the axle.

At the inner end of each journal box 4 there are four arms 36 extending radially therefrom. These arms are equally spaced from each other and from the horizontal center line of the journal box. Arranged around the axle 2 and extending parallel to its axis are four rigid connecting members 37 preferably in the form of I-beams. The opposite ends of each of these rigid members 37 are mounted in openings provided in an oppositely arranged pair of arms 36 projecting from the two journal boxes. In each of these openings a resilient member 29 made of material such as rubber, is interposed between the opposite sides of the end of the rigid member 37 and the side walls of said openings. Rivets 38 extend through each of the arms and the resilient member 29 and the end of the member 37 therein securing said member to said arm. The journal boxes 4 thus resiliently support the connecting members 37 in a desired relation equally spaced from each other around the axle 2, and it should be noted that said members are disposed beyond the other peripheries of the several rotatable brake elements 11 to 14.

Each of the several non-rotatable brake elements 15 to 18 is provided around its outer periphery with suitably spaced slots 39 through which the several rigid connecting members 37 extend. The width of the slots 39 is substantially equal to the dimension between the engaging portions of the members 37 in order to minimize lost motion between said brake elements and members in a direction around the axle 2, but providing for sliding or axial movement of the several non-rotatable brake elements on said members.

Each of the non-rotatable brake elements 15 to 18 comprises a central portion 40 preferably made of steel so as to be capable of deflection to a certain extent without cracking. The inside diameter of this central portion 40 is preferably somewhat greater than that of the flanges 23 extending from the sleeve 21 and of the spacer rings 35. The overall dimension of the central portions 40 of the non-rotatable brake elements is equal at least substantially to the distance across the outer faces of a diametrically opposite pair of support members 37 in order to provide for slots 39.

The central portion 40 of each of the non-rotatable brake elements is provided for carrying on each of its opposite faces an annular ring-like brake shoe 43, the two shoes on each element being rigidly secured thereto in any desired manner. The outside diameter of the brake shoes 43 is substantially the same as that of the rotatable brake elements, while the inside diameter of said brake shoes is slightly less than the inside diameter of the central portions 40 of the non-rotatable brake elements. Each of the brake shoes 43 thus provides a braking face of such radial width as to frictionally engage a portion of the adjacent rotatable brake element near its outer periphery.

The brake shoes 43 are preferably made of a material which will provide a desired coefficient of friction for braking purposes when in contact with the rotatable brake elements which are made of a harder material. By this arrangement it is intended that in use the rotatable brake elements will not wear materially while the shoes 43 on the non-rotatable brake elements will wear like ordinary shoes. The rotatable brake elements will therefore last for an indefinite period of time and when it is necessary to repair the mechanism only the non-rotatable brake elements will have to be renewed.

Since the rotatable brake elements are adapted to last for an indefinite period they are preferably made in one piece adapted to be mounted in place around the sleeve 21 prior to mounting of the locomotive wheels 1 and journal boxes 4 on the axle 2, as above described.

In order, however, to provide for replacement of the non-rotatable brake elements 15 to 18 when required, these elements are preferably made in a plurality of arcuate shaped sections adapted to be applied around the sleeve 21 and removed therefrom when required. To illustrate this structure, the non-rotatable brake element 15 is shown in Fig. 3 as made in two complementary sections which are oppositely arranged with their opposite ends in abutting relation at lines of division such as indicated by the reference numeral 44. When in this relation it will be apparent that the two sections of the element form a ring-like structure.

The two sections of the non-rotatable element are rigidly secured together in this abutting relation by straps 45, preferably made of steel, and having their inner edges spaced from the brake shoes 43 while their outer edges are shaped to the outer contour of the central portion 40 of the element. The straps 45, one of which is provided on each side of the central portion 40 of the element over each joint between the two engaging sections, are preferably welded to said central portion to provide a rigid connection between the two sections of the brake element for holding same in a fixed annular relation. The length of the straps 45 is preferably the same as the distance between the two adjacent I-beams 37 so as to bear against said beams at either side of the bearing of the central portion 40 of the brake element and thus provide additional area of contact between the non-rotatable brake element and said beams to resist wear.

Straps 46 like the straps 45 are provided on the opposite sides of the central portion 40 of the non-rotatable brake elements 90 degrees from the straps 45, so as to bear against the faces of beams 37 opposite those engaged by the straps 45. The non-rotatable brake elements 16, 17 and 18 may be constructed in identically the same manner as the element 15 just described.

The annular brake cylinder device 10 comprises two annular side pieces 50 which are preferably formed of sheet metal and which have an outer contour like that of the non-rotatable brake elements. Each of the side pieces 50 is provided in its outer periphery with slots 51 which are so spaced as to receive the rigid connecting members 37 for supporting the brake cylinder device.

The brake cylinder device further comprises a plurality of relatively small brake cylinders 52 which are equally spaced from each other around the axle 2 on a circle concentric therewith and with their axes parallel to that of said axle. Each of the brake cylinders 52 is provided at each end with a portion 53 of reduced diameter which has a sliding fit in a suitable bore in one of the side pieces 50 and which provides a shoulder for engagement by the inner face of the side piece. The side pieces may be secured to each other by bolts 47 extending therethrough and through sleeves 48 interposed between with their opposite ends engaging the inner faces of the side pieces. By this arrangement the several brake cylinders 52 are rigidly clamped between and carried by the two side pieces 50.

Each of the side pieces 50 is preferably made in two complementary, arcuate and oppositely disposed sections meeting at the line 54, shown in Fig. 2, and rigidly secured together around the axle 2 by plates 55 which overlap the abutting portions of the sections. One end of each of the plates 55 is welded to one of the portions while the other end is secured to the other portion by bolts 56. This structure provides for ready removal and replacement of the brake cylinder device from around the axle 2 in case it is necessary to repair or replace same.

The brake cylinder device 10 is rigidly secured to the connecting members 37 in its working position midway between the two piles of brake elements by brackets 57. These brackets are angle shaped and have one end secured to a connecting member 37 by a removable bolt 58 and the opposite end secured to a side piece 50 of the brake cylinder device by bolts 59.

A vertically disposed torque arm 61 is arranged directly over the axle 2 with a portion interposed between and welded to the side pieces 50 of the brake cylinder device. The torque arm 61 extends above the brake cylinder device and its upper end is mounted to slide vertically in an opening 62 provided through a torque member 63 extending transversely of the locomotive and having its opposite ends secured by bolts 64 to the oppositely arranged frame side members 5. A wear plate 65 is secured to each of the front and rear faces of the portion of torque arm 61 disposed in opening 62 for sliding contact with the opposite sides of said opening.

Each of the brake cylinders 52 has a through bore open at opposite sides of the brake cylinder device 10 and containing two oppositely arranged pistons 67 and 68. The piston 67 has projecting from its outer face a piston stem 69 which engages the adjacent shoe 43 on the non-rotatable brake element 18 at the left-hand side of the brake cylinder device as viewed in Fig. 1, while the piston 68 has an oppositely extending stem 70 engaging the adjacent shoe 43 of the other non-rotatable brake element 18. The several brake cylinders 52 and thereby the pistons 67 and 68 and the pistons rods 69 and 70, respectively, are so arranged that said rods will engage the shoe portions 43 of the respective non-rotatable brake elements substantially midway between their outer and inner peripheries.

Between each pair of pistons 67 and 68 there is provided a pressure chamber 71. This chamber in each brake cylinder is open by way of a port 72, provided through the cylinder substantially midway between its ends, to a pipe 73 leading to the adjacent brake cylinder at one side thereof and through a port 74 to another pipe 73 leading to the brake cylinder at the opposite side. Through these ports in each of the brake cylinders and the several pipes the pressure chambers 71 in the several brake cylinders are all in communication with each other. One of the brake cylinders 52 is also provided with a port 75 substantially midway between its ends and open to the pressure chamber 71 therein. This port 75 is provided for connecting the pressure chamber 71 in the one brake cylinder to a pipe 76 through which fluid under pressure is adapted to be supplied to and released from said pressure chamber and thereby the pressure chambers in all of the other brake cylinders. The supply of fluid under pressure to and its release from pipe 76 may be controlled in any suitable manner.

In the drawings the annular rotatable and non-rotatable friction disks or brake elements are all shown in their release positions disengaged from each other, and the pistons 67 and 68 in the several brake cylinders 52 are under this condition adapted to assume their release positions shown in Fig. 1 and in which the pistons in each brake cylinder are in engagement with each other at the center of the brake cylinder. The release positions of the rotatable brake elements 12, 13 and 14 are defined by engagement with the shoulders 33 and 34 on the torque bolts 26 and by engagement of rings 35 with the sleeve flanges 23 respectively, as above described.

In order to move the rotatable brake elements 12, 13 and 14 to their release positions just described there are provided at each side of the brake cylinder device 10 for each pile of brake elements a plurality of release mechanisms 79 which are equally spaced from each other around the sleeve 21.

Each of the release mechanisms 79 comprises a bolt 80 extending parallel to the axis of sleeve 21 through suitably aligned bores in the sleeve flange 23, spacer ring 35, and in the rotatable brake elements 14, 13 and 12 and into the space between said sleeve and the inner periphery of the brake cylinder device, said bores in said brake elements being indicated by the reference numerals 81 to 83, respectively. Each bolt 80 has a free and preferably slightly loose sliding fit in the bores through flange 23 and ring 35, and in the bore 81 through the rotatable brake element 14. The bore 82 through the rotatable brake element 13 is of greater diameter than bore 81 in the brake element 14 while the bore 83 in the brake element 12 is of still greater diameter. A bore 84 is provided through the rotatable brake element 11 in coaxial alignment with the bores 81, 82 and 83 in the other rotatable brake elements and is of greater diameter than bore 83.

A nut 85 is screw-threaded on the end of each bolt 80 between the side pieces 50 of the brake cylinder device 10 for engagement by a spring seat 86. A like spring seat 87 is slidably mounted on each bolt between the seat 86 and the flange 23 extending from sleeve 21 and interposed between and bearing against these spring seats is a release spring 88 which is under compression.

At the opposite end of each bolt 80 is a head 89 bearing against a washer 90 which is slidably mounted on the bolt. A sleeve 91 is slidably mounted on each bolt 80 and has one end bearing against the washer 90. The other end of the sleeve 91 terminates in the space between the rotatable brake elements 13 and 14 when in their release positions, as shown in Fig. 5, and is provided there with an annular flange 92. Between this flange and the adjacent face of the rotatable brake element 14 a washer 93 is slidably mounted on the bolt 80 and a coil release spring 94 under compression and encircling said bolt is interposed between and bears against the washer 93 and flange 92.

Two sleeves 95 and 96 are slidably mounted on each sleeve 91, the sleeve 95 being adjacent the flange 92 while the sleeve 96 is adjacent the bolt head 89. The sleeve 95 has a loose fit in bore 82 through the rotatable brake element 13 and is provided with an annular collar 97 of greater diameter than said bore and disposed in the space between the brake elements 12 and 13. Interposed between the sleeves 95 and 96 and encircling the sleeve 91 is a release spring 98 which is under compression when the brakes are released as shown in Fig. 5. The sleeve 96 has a loose fit in the bore 83 in the brake element 12 and is provided on its outer end with an annular collar 99 of greater diameter than said opening. The outer end of the sleeve 96 is engaged by the washer 90.

The washer 93 and collar 92 on sleeve 91 are of substantially the same diameter as sleeve 95 so as to freely pass through the bore 82 in the brake element 13. The collar 97 on the sleeve 95 is of substantially the same diameter as the sleeve 96 so as to pass through the bore 83 in the brake element 12. The collar 99 on the sleeve 96 is of considerably less diameter than bore 84 in the rotatable brake element 11 so as to freely pass therethrough.

From the above description it will be apparent that in each release mechanism 79 the action of the release spring 88 on the release bolt 80 is transmitted through the head 89 of the bolt, washer 90, sleeve 96 and flange 99 of said sleeve directly to the rotatable brake element 12, so that the several springs 88 are directly operative on said element to effect movement thereof into contact with the release position defining shoulders 33 on the torque bolts 26. The pressure of the release spring 88 thus applied to the sleeve 96 on the several release bolts 80 is adapted to act through the release spring 98 on each bolt on the sleeve 95 and thence through the collar 97 on the rotatable brake element 13 for resiliently urging said brake element against its release position defining stop shoulders 34 on the torque bolts 26. Likewise, the pressure of the release springs 88 is transmitted directly through the release bolts 80 and sleeves 91 thereon to the release springs 94 for resiliently urging the rotatable brake element 14 to its release position defined by engagement of spacer ring 35 with collar 28. It will thus be apparent that since there is a positive connection between the release springs 88 and only one of the rotatable brake elements and a resilient connection between said springs and the other rotatable brake elements positive engagement between all of said brake elements and their respective release position defining stops is assured when the brakes are released as shown in Fig. 5, even though there might be slight variations in the manufacture of various parts such as the location of the different shoulders on the torque bolts 26 for defining the release positions of the brake elements. By this arrangement the rotatable brake elements will be urged against their release stops when the brakes are released with such force as will prevent rattling or vibration of the elements and consequent premature and excessive wear thereof on the torque bolts 26.

When an application of brakes is effected, as will be hereinafter described, the rotatable brake elements 14, 13 and 12 are adapted to be moved axially in the direction of the rotatable brake element 11, the degree of such axial movement depending upon the worn condition of the brake shoes 43 on the several non-rotatable brake elements. When the brake shoes 43 are new and the brakes are applied, the sleeves 95 and 96 will be still in the bores 82 and 83 but disposed slightly to the right from the positions shown in Fig. 5 with respect to the brake elements 13 and 12, respectively. As the brake shoes 43 become worn however the sleeves 95 and 96 will be moved further out of the respective bores 82 and 83 in applying the brakes until at the time when the brake shoes become completely worn out, the sleeves 96 will be moved entirely out of the bores 83 and past the outer face of the rotatable brake element 12, a portion of the sleeves 95 still remaining in bores 82 in the rotatable brake element 13 however under this extreme worn condition. Before sleeves 96 move out of bores 83 however the collars 97 on the sleeves 95 will enter the bores 83 in the rotatable brake element 12 so as to maintain the sleeves 96 aligned with said bores for reentry upon subsequent movement of the brake elements to their release positions. This will be readily apparent from an inspection of Figs. 5 and 6 of the drawings, it being noted that in Fig. 6 the brake shoes 43 on the non-rotatable brake element are completely worn away thereby representing a worst possible worn condition of the brake mechanism which may never be permitted in service, but under which condition the collars 97 on the sleeves 95 are still disposed in the bores 83 in the brake element 12 for the purpose above specified. The bores 84 in the rotatable brake element 11 may be of such diameter as to insure against fouling of the collars 99 on sleeves 96 with the brake element 11 in effecting an application and release of the brakes.

Secured to each of the rigid connecting members or I-beams 37 beyond the outer peripheries of the non-rotatable brake elements 15, 16 and 17 is a release position defining stop device 100 for said brake elements. Each of the stop devices 100 has at one end a pair of depending fingers 101 which are spaced apart and arranged to engage a pair of shoulders 102 extending upwardly from the bottom of the aligned slot 39 in the central portion 40 of the non-rotatable brake element 17 for limiting movement of said element in the direction of the brake cylinder device and to thereby define its release position. The release position of the non-rotatable brake element 15 in each of the piles is defined by engagement of shoulders 103 extending upwardly from the bottom of the slots 39 in the brake element with fingers 104 depending from the opposite end of the stop devices 100, these shoulders and fingers being spaced apart and like the shoulders 102 on the non-rotatable brake element 17 and fingers 101 at the opposite end of the stop devices. Intermediate the ends of each stop device 100 there is provided a finger 105 extending therefrom in line with the spaces between the fingers 101 and 104 at the opposite ends of the stop device, this finger 105 being disposed to engage a lug 106 extending upwardly from the bottom of the aligned slot 39 in the non-rotatable brake element 16 for limiting movement of said element in the direction of the brake cylinder device and to thereby define its release position.

In effecting an application of brakes the non-rotatable brake elements in each pile are adapted to be moved in the direction of the rotatable brake element 11 and after a certain amount of wear of the brake shoes 43 has occurred the non-rotatable brake element 17 will have to move past the stop fingers 105 of the several stop devices 100. This is provided for however by the construction of the stop devices for the non-rotatable brake elements 16 since it will be noted that there is space provided between the shoulders 102 on the non-rotatable brake element 17 to accommodate the release stop fingers 105 for the non-rotatable brake element 16 so that the non-rotatable brake element 17 is capable of moving freely past the stop fingers 105 as will be clear from Figs. 3, 7 and 8 of the drawings. Under such a condition the non-rotatable brake element 18 will also have to move past the stop fingers 101, but this is permitted due to the fact that the slots 39 in said element do not have shoulders 102 therein which would prevent such movement.

As above described, the brake cylinder pistons 67 and 68 in the several brake cylinders 52 are adapted to engage each other at the center of said cylinders when the brakes are released, and when so conditioned, engagement of the piston stems 69 and 70 with the non-rotatable brake elements 18 in the two piles is adapted to define the release positions of said elements. The non-rotatable brake elements 18 are at all times in contact with the piston stems as just mentioned.

For moving the non-rotatable brake elements and brake cylinder pistons to their release positions a plurality of release mechanisms 108 including bolts 109 are provided for each pile of elements and the associated brake cylinder pistons, said bolts being spaced from each other around the axle in the space between the outer peripheries of the rotatable and non-rotatable brake elements and extending parallel to the axis of the brake elements.

Each of the release bolts 109 is slidably mounted in a suitable bore in one side piece 50 of the brake cylinder device and extends from the space between the two side pieces 50 through suitable coaxially aligned bores 110 to 113 in the central portions 40 and the straps 45 or 46 of the several non-rotatable brake elements. It will be noted that the section in Fig. 5 is taken through the straps 46 but the same showing would be obtained were this section taken through the straps 45.

Referring now to Fig. 5, it will be noted that the bore 110 provides a loose fit between the brake element 18 and the release bolt 109 while the bores 111, 112 and 113 through the non-rotatable brake elements 17, 16 and 15, respectively, are of successively greater diameters in the order named. On the end of each bolt 109 between the side pieces 50 of the brake cylinder device there is provided a nut 114 and engaging the inner face of this nut is a spring seat 115. A like seat 116 is slidably mounted on each bolt 109 and engages the adjacent face of the brake cylinder side piece 50. Interposed between and bearing against the two spring seats is a coil release spring 117 which encircles the bolt and which is under compression.

Each bolt 109 has a head 118 disposed beyond the outside face of the non-rotatable brake element 15 and slidably mounted on the bolt and engaging said head is a washer 119. A sleeve 120 is slidably mounted on each bolt 109 and has one end engaging the washer 119 while the other end terminates in the space between the non-rotatable brake elements 17 and 18 and is there provided with an annular flange 121. Slidably mounted on each bolt 109 beyond flange 121 is a washer 122 bearing against the adjacent face of the brake element 18, and a spring 123 encircling the bolt is interposed between said washer and flange, said spring being under compression when the brakes are released as shown in Fig. 5.

A sleeve 124 is slidably mounted on the sleeve 120 and bears at one end against the washer 119. The opposite end of sleeve 124 terminates in the space between the brake elements 16 and 17 and there is provided with an annular outwardly extending flange 125. Slidable on the sleeve 120 in the bore 111 through the non-rotatable brake element 17 is another sleeve 126. The sleeve 126 has a loose fit in bore 111 and is provided at one end with an annular collar 127 disposed between the brake elements 17 and 16. Between collar 127 and the flange 125 and encircling sleeve 120 is a coil release spring 128 which is under compression. Projecting from the outer periphery of collar 127 is a cylindrical guide portion 129 having the same outside diameter as the flange 125 and adapted to freely enter bore 112 through the non-rotatable brake element 16.

A sleeve 130 is slidably mounted on the sleeve 124 and is normally disposed in the bore 112 in the brake element 16, said bore being of slightly greater diameter than said sleeve. On the end of sleeve 130 disposed between the brake elements 15 and 16 is an annular collar 131 and projecting from the outer periphery thereof in the direction of brake element 15 is a cylindrical guide 132 of slightly smaller diameter than bore 113 through the brake element 15.

A sleeve 133 of the same diameter as guide 132 is mounted on the sleeve 124. The outer end of the sleeve 133 engages the washer 119 and is provided with an annular collar 134 for engagement with the outer face of the nonrotatable brake element 15. A release spring 135 encircling sleeve 124 is interposed between the adjacent ends of sleeve 133 and sleeve 130, said spring being under compression when the brakes are released.

From the showing in Figs. 5 and 6 and the above description it will be apparent that the release mechanisms 108 for the non-rotatable brake elements are substantially the same as the release mechanisms 79 for the rotatable brake elements except adapted for conditioning more brake elements. In operating the force of the several release springs 117 is applied directly through the bolts 109 only to the non-rotatable brake elements 15, the application of such force to the other non-rotatable brake elements 16 to 18 being through the medium of the springs 135, 128 and 123, respectively, whereby positive engagement between the several non-rotatable brake elements and their release stops is assured when the brakes are released so as to avoid rattling and undue wear of the brake elements and associated parts. Engagement between the innermost non-rotatable brake elements 18 and the brake cylinder piston stems 69 or 70 define the release positions of said elements, said piston stems being urged to their release positions by the force of springs 117 applied to the non-rotatable brake elements 18.

The collars 132 on sleeves 130 are adapted to freely enter the bores 113 in the non-rotatable brake element 15 and the collars 129 on the sleeves 126 are also adapted to freely enter the bores 112 in the non-rotatable brake elements 16 so that after such wear of the brake shoes has occurred as to permit movement of the sleeves 133 and 130 out of the bores 113 and 112 respectively, in effecting an application of brakes such sleeves will be maintained in alignment with their bores for reentry in effecting a subsequent release of brakes. It will also be noted that this structure embodying sleeves of increasing diameters as above described provides for maximum wear of all brake elements without interference from the release mechanisms since the sleeves in applying the brakes may move into the next adjacent brake element in the direction of the rotatable brake elements 11 and thus have no influence upon the spacing of said elements.

In both the release mechanisms 79 for the rotatable brake elements and the release mechanisms 108 for the non-rotatable brake elements it will be noted that the force of the release springs 88 and 117, respectively, is not applied through one brake element to another but is applied to each brake element separately from the others so that the release movement of each brake element is independent of the other. The release springs 88 and 117 are located outside of or beyond one end of each pile of brake elements so that their dimensional and force characteristics may be made whatsoever is desired.

*Operation of embodiment shown in Figs. 1 to 8*

Let it be assumed that the pressure chamber 71 in the several brake cylinders 52 is void of fluid under pressure under which condition the release springs 117 for the non-rotatable brake elements and brake cylinder pistons 85 and the release springs 88 for the rotatable brake elements will be maintaining said elements and pistons in their release positions above described so as to permit free rotation of the rotatable brake elements and thereby of the locomotive wheels 1 relative to the non-rotatable brake elements.

If it is now desired to effect an application of the brakes on driver wheels 1, fluid under pressure is supplied through the pipe 76 to the pressure chamber 71 of the connected brake cylinder 52 and from said chamber through the pipes 73 to the pressure chambers 71 in the several other brake cylinders. The pressure of fluid thus obtained in chambers 71 between the piston 67 and 68 in the several brake cylinders then acts to move said pistons in opposite directions away from each other for thereby moving the interleaved non-rotatable and rotatable brake elements successively into contact with each other and against the rotatable brake element 11 at the outer end of each pile. Since the non-rotatable brake elements are held against rotation by the connection through torque arm 61 with the cross member 63 connected to the frame side members 5, it will be apparent that when the brake elements are forced into frictional contact with each other a drag is created on the rotatable brake elements 11, 12, 13 and 14 to cause retardation thereof and to thereby effect braking of the locomotive wheels 1. The degree of this braking is dependent upon the pressure acting on the brake cylinder pistons forcing the brake elements into contact with each other and may be varied in the usual manner to provide any desired degree by varying the pressure of fluid supplied to chambers 71 to actuate the brake cylinder pistons.

It will be noted that although the journal boxes 7 support the non-rotatable brake elements through the medium of the rigid connecting members 37 said journal boxes are not subject to any twisting action during braking since the non-rotatable elements are held against rotation by the locomotive frame as is desirable to avoid binding of the journal boxes between their pedestal legs 6 and as a consequence, excessive wear of the engaging surfaces.

When it is desired to release the brakes on the locomotive wheels 1 after an application, the fluid under pressure is vented from the supply pipe 76 and thereby from the pressure chamber 71 in the several brake cylinders 52 where upon the release mechanism 79 for the rotatable brake elements and the release mechanisms 108 for the non-rotatable brake elements and brake cylinder pistons operate to return these parts to their release positions in which the brake elements are out of contact with each other to permit free rotation of the rotatable brake elements with the driver wheels 1.

The operation of the release mechanisms for the non-rotatable brake elements and brake cylinder pistons and for the rotatable brake elements in effecting an application and release of the brakes will now be described in greater detail.

When the non-rotatable brake elements are moved axially in the direction of the rotatable brake elements 11 in effecting an application of the brakes the initial movement of each non-rotatable brake element 18 is relative to the release bolts 109 and acts to compress the release springs 123, interposed between said element and the sleeves 120, substantially solid thereby providing a substantially rigid driving connection between said non-rotatable brake elements and the heads 118 on the release bolts 109 so that said bolts will move with said brake elements during further movement thereof. As each brake element 18 continues to be moved the flanges 121 on the end of sleeves 120 move into engagement with the sleeves 126 since the springs 128 act at this time to oppose movement of the sleeves 126. After this occurs the sleeves 126 are then moved with the non-rotatable brake element 18 and act to compress the springs 128. When the pressure of springs 128 is sufficiently increased, they then act to move the sleeves 124 with the sleeves 120 and this continues until the flanges 125 on the ends of sleeves 124 contact the sleeves 130 which are then picked up and caused to act through the springs 135 to move the sleeves 133 along with further movement of the non-rotatable brake elements 18 and bolts 109.

When all of the non-rotatable brake elements in each pile have then obtain their brake application positions, the collars 127, 131 and 134 on the several sleeves 126, 130 and 133, respectively, will be moved out of contact with their respective brake elements, but until an extensive amount of wear of the brake shoes 43 occurs, said sleeves will remain in the bores in the respective brake elements and thus in condition to render the release springs 117 operable to return the non-rotatable brake elements to their normal positions shown in Fig. 5 upon the subsequent release of brakes. After extensive wear of the brake shoes 43, the sleeves 130 and 133 may move completely out of the bores 112 and 113 in the non-rotatable brake elements 15 and 16, respectively, in applying the brakes. However, before this occurs, the guide portions 127 and 132 of the sleeves 126 and 130 will move into the bores 112 and 113 of the non-rotatable brake elements 15 and 16, respectively, and will remain therein with the brakes applied, as clearly shown in Fig. 6 which shows the brake elements in brake applied position with the brake shoes 43 completely worn out which represents the very maximum condition of wear and which condition may never be obtained in actual use. The guide portions 127 on sleeves 126 being in the bores 112 while the brakes are applied maintain the sleeves 130 in coaxial relation with said bores for reentry upon a subsequent release of brakes, while the guide portions 132 on the sleeves 130 being in bores 113 acts in a like manner to insure reentry of the sleeves 133, as will be apparent.

Now referring to the release mechanisms 79 for the rotatable brake elements. As the rotatable brake elements 14, 13 and 12 in each of the piles is successively picked up and moved to their brake application positions, it will be noted that the initial movement of the rotatable brake elements 14 will act to compress the springs 94 following which said springs will act to move the sleeves 91 and thereby the bolts 80 along with the rotatable brake elements 14. As brake elements 14 continue to be moved, the collars 92 on sleeves 91 engage the ends of sleeves 95 and carry same along with the bolts. As the sleeves 95 are thus moved, springs 98 are compressed to a degree sufficient for moving the sleeves 96 along with the respective bolts 80. The sleeves 95 and 96 will not move out of the bores 82 and 83 in the brake elements 13 and 12 until after a considerable degree of wear of the brake shoes 43 on the non-rotatable brake elements has occurred, but after this occurs the sleeves 96 will move out of the bores 83. Before this occurs however the guides 97 on sleeves 95 will enter the bores 83 so as to thereby insure reentry of the sleeves 96 in said bores upon a subsequent release of brakes. The positions which these sleeves will occupy under a maximum condition of wear of the brake mechanism is illustrated in Fig. 6 from which the above operation will be apparent.

*Description of embodiment of invention shown in Figs. 9 to 15*

On some locomotives there may not be adequate clearance space for the installation of a brake mechanism embodying the rigid connecting members or I-beams arranged around the axle 2 and secured to the journal boxes for carrying the non-rotatable brake elements and brake cylinder device and having a vertically extending torque arm 61 requiring the beam or cross member 63 extending across the locomotive frame secured to the top of the locomotive side members 5, as shown in the embodiment of the invention in Figs. 1 to 8. The modified form of brake mechanism shown in Figs. 9 to 13 is adapted to overcome this difficulty.

This modified form of brake mechanism which is adapted to be installed in the same location on a locomotive as the embodiment above described is also similar thereto in that it comprises an annular brake cylinder device 136 including a plurality of oppositely acting brake cylinders 52 for controlling the operation of a pile of brake elements at either side of the brake cylinder device, said brake cylinder device and brake elements encircling the sleeve 21.

Each pile of brake elements comprises four rotatable brake elements 137 to 140 and four interleaved non-rotatable brake elements 141 to 144, these elements being arranged with the rotatable brake element 137 at one end of the pile and the non-rotatable brake element 144 at the opposite end of the pile for engagement by the adjacent brake cylinder piston rod 69 or 70.

The inside diameter of the rotatable brake elements 137 is such as to overlap the flanges 20 on sleeve 21 and extending through these overlapping portions and through the collars 22 and flanges 23 on sleeve 21 in each pile of brake elements are a plurality of bolts 145 securing said sleeve and thereby said rotatable brake elements to rotate with the locomotive wheels 1. The flange 23 and rotatable brake element 137 in each pile of brake elements are also rigidly connected in spaced relation by a plurality of torque bolts 146. Each of these bolts has a head 147 engaging the outer face of the respective sleeve flange 23 and a cylindrical portion of uniform diameter extending between the inner face of said flange and the adjacent face of the rotatable brake element 137 at which point the bolt is reduced in diameter to provide a shoulder 148 for engaging the inner face of the rotatable brake element 137. The reduced portion of each bolt 146 then extends through the rotatable brake element 137 and on its outer end there is provided a nut 149 rigidly securing the bolt in place. The nut 149 on each of the torque bolts 146 and the nut 150 on the end of each of the bolts 145 are preferably welded to the ends of the bolts to prevent their backing off.

The inside diameter of the rotatable brake elements 138, 139 and 140 in each pile is greater than that of collar 22 extending from the sleeve 21. The collar 22 is provided on its inner face with a plurality of outwardly extending stop fingers 151 arranged to engage the rotatable brake element 138 for limiting movement thereof on the torque bolts 146 away from the rotatable brake element 137 to thereby define its brake release position. Extending outwardly from the sleeve 21 between each collar 22 and flange 23 are two oppositely disposed arcuate shaped portions 152 the outside diameters of which are less than the inside diameters of the rotatable brake element 140. A stop finger 153 projects outwardly from each of the opposite ends of each of the arcuate shaped portions 152 for engaging the rotatable brake element 139 to limit movement thereof in a direction away from the rotatable brake element 137 and to thereby define the release position of the rotatable brake element 139. The release position of the rotatable brake element 140 in both piles is adapted to be defined by engagement with the flanges 23 extending from sleeve 21.

The stop fingers 151 for the rotatable brake elements 138 are arranged around the sleeve in staggered relation to the fingers 153. The inner periphery of each of the rotatable brake elements 139 is provided with slots 154 aligned with the stop fingers 151 to provide for movement of said rotatable brake element over said fingers, while slots 155 are provided in the inner edge of the rotatable brake element 140 lined up with the fingers 153 to provide for movement of the rotatable brake element 140 over said fingers 153 from one side to the other.

In this embodiment of the invention each of the journal boxes 4 is provided on each side with an outstanding lug 156 the top and bottom sides of which taper toward each other away from the journal box. Two rigid beams 157 arranged one at each of the opposite sides of the axle 2 and extending parallel therewith have their opposite ends mounted over the lugs 156 on the oppositely arranged journal boxes. The ends of the beams engaging the lugs 156 are provided with tapered pockets to fit the tapered sides of said lugs to provide a rigid connection between said beams and lugs, and said beams are secured to the journal boxes in this position by bolts 158.

The non-rotatable brake elements 141 to 144 in this embodiment of the invention are preferably substantially like those hereinbefore described in that each comprises a central steel portion 159 to both of the opposite sides of which is secured a brake shoe 160 for frictional contact with the face of the adjacent rotatable brake element. However, in this embodiment each of the non-rotatable brake elements is preferably made in three sections of equal length which are joined in abutting relation by U-shaped clips 161 which lap over the opposite sides of the abutting portions of the sections and which are welded thereto to provide a rigid annular ring-like element. As will be noted in Fig. 11 these clips are preferably so arranged that one is directly above the axle 2 so that the others are out of alignment with the beams 157 at the opposite sides of the axle.

The non-rotatable brake elements are provided in each of their opposite sides with a slot 162 to receive the beams 157, the central portion 159 of said brake elements being provided both above and below each of the beams and on both sides with a plate 163 preferably welded thereto and adapted to provide increased rigidity of the element against distortion as well as increased bearing surface in sliding contact with the respective beam 157.

Beyond the outer periphery of each pile of brake elements there are two bolts 164 extending through each of the beams 157, and slidably mounted on each of these pairs of bolts is a clip 165, which is of greater length than the width of the beams so as to extend over the opposite sides thereof for engagement with the non-rotatable brake elements in the respective pile. On the outer end of each of these bolts there is a nut 166 under which is a washer 167 and interposed between each of these washers and the clip 165 is a spring 168 which is under compression. The clips 165 are thus resiliently urged in the direction of the axle 2 against the edges of the non-rotatable brake elements.

The annular brake cylinder device 136 is substantially like that shown in Fig. 1 in that it comprises a pair of oppositely disposed side pieces 170 carrying a plurality of brake cylinders 52 and secured in spaced relation by spacer sleeves 48 and bolts 47. Directly below the axle 2 the brake cylinder device is provided with a depending torque arm 173 preferably secured to the oppositely disposed side pieces 170 by welding and having its lower end disposed in an opening 174 provided through a member 175 extending transversely of the locomotive and secured to its opposite ends by bolts 176 to the usual caps 177 connecting the pedestal legs at the opposite sides of the journal boxes. It will thus be apparent that while the journal boxes through the medium of beams 157 directly support the non-rotatable brake elements and the brake cylinder device said elements are secured against rotation by the locomotive frame members 5 through the medium of the pedestal legs so as to avoid twisting of the journal boxes between said legs during braking.

The brake cylinder device 136 is preferably made in two arcuate sections of unequal length the shorter section being of such length as to permit the longer section to be mounted over the axle sleeve 22, and the two sections are then rigidly secured together by plates 180 lapping over the abutting portions of the sections and welded to one of the sections and secured by bolts 181 to the other section. The brake cylinder device is provided with two oppositely disposed slots to receive the beams 157 and the beams are provided between the two side pieces of the brake cylinder device with outstanding ears 182 through which and the engaging side pieces, bolts 183 are provided which rigidly secure the brake cylinder device to the beams.

Each brake cylinder 52 contains two brake cylinder pistons provided with oppositely extending piston stems 69 and 70 as in the embodiment above described, the stems 69 being provided for operating the brake elements in one pile while the stems 70 are provided for operating the brake elements in the other pile, said stems engaging the non-rotatable brake elements 144 in the two piles and defining the release positions thereof when the pistons are in engagement at the center of their respective cylinders.

For defining the release positions of the other non-rotatable elements 143, 142 and 141, three stop devices 186 are provided for said elements in each pile. These stop devices are equally spaced from each other around the outside of the brake cylinder device and each has one end secured by rivets 187 to the adjacent side piece 170 of the brake cylinder device. Each of the stop devices 186 in each pile of brake elements extends over the outer peripheries of the non-rotatable elements 144, 143 and 142 and at its opposite end is provided with a stop finger 188 extending into the space between the non-rotatable brake elements 141 and 142 for engagement by the non-rotatable brake element 141 to limit axial movement thereof in the direction of the brake cylinder device for thereby defining its brake release position. For the same purpose a finger 189 extends from each stop device into the space between the non-rotatable brake elements 142 and 143 for engagement by the non-rotatable brake element 142, while still another finger 190 extends into the space between the non-rotatable brake elements 143 and 144 when in their release positions for engagement by the non-rotatable brake element 143 to define its brake release position.

As most clearly shown in Fig. 12, it will be noted that the finger 189 in each stop device is offset to one side of the fingers 188 and 190 which are in alignment in the axial direction of the brake elements. The non-rotatable brake element 142 in each pile is provided with slots 191 aligned with the stop fingers 188 to permit movement of said element past said fingers in the direction of applying the brakes. The non-rotatable element 143 in each pile is provided with slots 192 in alignment with the stop fingers 189 to permit movement of said element past said fingers in the direction of applying the brakes and for a like reason slots 193 are provided in the non-rotatable brake element 144 in alignment with the stop fingers 190.

For moving the rotatable and non-rotatable brake elements in both piles to their release positions, release mechanisms 79 and 108, respectively, like those hereinbefore described may be employed.

The operation of this embodiment of the invention will be evident in the light of the description of parts from the description of operation of the embodiment shown in Figs. 1 to 8. It is only desired to point out however, that in operation the oppositely arranged spring pressed clips 165 engaging the opposite sides of the non-rotatable elements in each pile not only prevent vibration of said elements on said beams but also act to maintain said elements in coaxial relation to insure free operation of the release mechanisms 108. It will be noted that clearance space is provided between the bottom of the slots 162 in the non-rotatable brake elements and the beams 157. Such clearance spaces in brake mechanism of this type are desirable to avoid binding between the brake elements and beams. The spring pressed clips normally offset these clearance spaces by minimizing radial movement of the elements horizontally, but it will be noted that said clips will give to radial movement of a brake element in case there is such a tendency so as to free the element for axial movement. Failure or premature wear of the brake mechanism due to binding on the beams is thus avoided, and the spring pressed clips offset the clearances required to obtain this desired result.

Summary

From the above description it will now be apparent that the improved brake mechanisms are relatively simple, yet compact and rugged in construction and though not limited in use, are particularly adapted for the braking of locomotive driver wheels where relatively high braking forces are required to obtain a desired degree of braking. Efficient means are provided for insuring movement of the brake elements out of frictional contact to effect a release of brakes and for defining the release positions of the brake elements. All rotatable parts of the brake mechanism are carried directly by the axle connecting the driver wheels but all non-rotatable parts are carried by the journal boxes supported by said axle. The journal boxes however are not subjected to twisting forces incident to braking since said forces are transmitted directly to the locomotive frame thereby preventing undue wear of the journal boxes and pedestal legs engaging same and insuring that the journal boxes will remain free between the frame pedestal legs to allow free vertical movement of the truck frame. Both embodiments of the invention are adapted for use on locomotives where there is adequate clearance space around a driver wheel axle for their installation, while the embodiment shown in Figs. 9 to 13 is also adapted for use on locomotives where clearance spaces are not available for the installation of the embodiment shown in Figs. 1 to 7.

In both embodiments the rotatable brake elements are preferably made of a material having an indefinite life and may therefore be made in a one piece ring form for application around the locomotive axle prior to assembling the journal boxes and driver wheels thereon. The non-rotatable brake elements are provided with brake shoes having suitable frictional characteristics and are intended to wear away and to need replacement and therefore such elements are preferably made in arcuate sections adapted to be applied around the axle and be welded together. The brake cylinder device in both embodiments is also made in arcuate sections so that it may be applied around the axle or removed therefrom when desired for inspection or renewal of parts.

While only two embodiments of the invention have been shown and described it is not the intention to limit it to these embodiments or otherwise than by the terms of the appended claims.

Having now described our invention, what we claim as new and desire to secure by Letters Patent is:

1. A disk brake mechanism for a wheel and axle assembly of a railway vehicle, comprising, a pile of interleaved annular rotatable and non-rotatable friction brake elements encircling said axle and operable upon frictional interengagement to brake said assembly, brake cylinder means for actuating said brake elements, means supporting said brake cylinder means and non-rotatable brake elements, means securing said non-rotatable brake elements against rotation, said axle having two spaced annular collars, a sleeve encircling said axle between said collars and having its opposite ends engaging said collars, means securing said sleeve to said collars for rotation with said assembly, and means carried by said sleeve securing said rotatable brake elements to said assembly for rotation therewith, said sleeve being formed in a plurality of longitudinal sections for application around said axle between said collars, and said sections being rigidly secured together in abutting relation.

2. A disk brake mechanism for a wheel and axle assembly of a railway vehicle, comprising, a pile of interleaved annular rotatable and non-rotatable friction brake elements encircling said axle and operable upon frictional inter-engagement to brake said assembly, brake cylinder means for actuating said brake elements, means carried by a non-rotatable part of the vehicle supporting said brake cylinder means and non-rotatable brake elements, means securing said non-rotatable brake elements against rotation, said axle having two spaced annular collars, a sleeve encircling said axle between said collars and having its opposite ends engaging said collars, means securing said sleeve to said collars for rotation with said assembly, and means carried by said sleeve securing said rotatable brake elements to said assembly for rotation therewith, said sleeve being formed in a plurality of longitudinal sections for application around said axle between said collars, and said sections being rigidly secured together in abutting relation.

3. A disk brake mechanism for a wheel and axle assembly of a railway vehicle, comprising, a pile of interleaved annular rotatable and non-rotatable friction brake elements encircling said axle and operable upon frictional interengagement to brake said assembly, brake cylinder means for actuating said brake elements, means supporting said brake cylinder means and non-rotatable brake elements, means securing said non-rotatable brake elements against rotation, said axle having two spaced annular collars, a sleeve encircling said axle between said collars and having its opposite ends engaging said collars, means rigidly securing said sleeve to said collars and secured to one of said rotatable brake elements for rotating same with said assembly and means carried by said sleeve for securing another rotatable brake element for rotation with said assembly and providing for axial movement thereof upon operation of said brake cylinder means.

4. A disk brake mechanism for a wheel and axle assembly of a railway vehicle, comprising, a pile of interleaved annular rotatable and non-rotatable friction brake elements encircling said axle and operable upon frictional interengagement to brake said assembly, brake cylinder means for actuating said brake elements, means supporting said brake cylinder means and non-rotatable brake elements, means securing said non-rotatable brake elements against rotation, said axle having two spaced annular collars, a sleeve encircling said axle between said collars and having its opposite ends engaging said collars, securing means at each of the opposite ends of said sleeve securing same to one side of the adjacent collar for turning said sleeve with said assembly, the rotatable element at one end of said pile being secured to the opposite side of said one collar by said securing means for rotation with said assembly and against axial movement, means rigidly secured to said sleeve and said one rotatable element supporting another rotatable element for rotation with said assembly and providing for axial movement thereof, said brake cylinder means being arranged to act on the end of said pile of brake elements opposite said one rotatable brake element.

5. A disk brake mechanism for a wheel and axle assembly of a railway vehicle, comprising, an annular double acting brake cylinder means and at either end thereof a pile of interleaved annular rotatable and non-rotatable friction brake elements operable by said brake cylinder means to effect braking of said assembly, said brake cylinder means and piles of brake elements being disposed between the wheels of said assembly in concentric relation with said axle, means supporting said brake cylinder means and non-rotatable brake elements, means securing said non-rotatable brake elements against rotation, said axle having two spaced annular collars, a sleeve encircling said axle with its opposite ends in contact with said collars, the outermost rotatable brake element in each of said piles being a rotatable brake element disposed in contact with one of said collars on the face opposite said sleeve, means extending through each end of said sleeve and the adjacent collar and rotatable brake element rigidly securing said sleeve and rotatable brake elements to said assembly in concentric relation and for rotation therewith, said sleeve having two annular flanges arranged between the two adjacent rotatable brake elements in the two piles, means carried by each of said flanges and the said outermost rotatable brake element at each end of each pile supporting another of said rotatable brake elements in each pile and securing same to said assembly for rotation therewith and providing for axial movement of the said other rotatable brake element.

6. A disk brake mechanism for a wheel and axle assembly on a railway vehicle having a journal box on said axle adjacent each of said wheels and having a truck frame mounted on the journal boxes, said brake mechanism comprising annular rotatable and non-rotatable friction brake elements operative upon frictional interengagement to effect braking of said assembly, annular brake cylinder means for actuating said brake elements, said brake elements and brake cylinder means being located between said journal boxes and encircling said axle in concentric relation therewith, means securing said rotatable brake elements to said assembly for rotation therewith, rigid means extending parallel to the axis of said axle and secured at opposite ends to said journal boxes for supporting said non-rotatable elements and brake cylinder means from said journal boxes, and other means securing said rigid means to said frame for holding said rigid means and thereby said brake cylinder means and non-rotatable brake elements against rotation.

7. A disk brake mechanism for a wheel and axle assembly on a railway vehicle having a journal box on said axle adjacent each of said wheels and having a truck frame mounted on the journal boxes, said brake mechanism comprising annular rotatable and non-rotatable friction brake elements operative upon frictional interengagement to effect braking of said assembly, annular brake cylinder means for actuating said brake elements, said brake elements and brake cylinder means being located between said journal boxes and encircling said axle in concentric relation therewith, means securing said rotatable brake elements to said assembly for rotation therewith, a plurality of rigid means extending parallel to the axis of said axle and spaced from each other about said axle, and secured at opposite ends to said journal boxes, said brake cylinder means being carried by said rigid means, said non-rotatable brake elements being carried by said rigid means and being movable thereon axially of said assembly, and a rigid member extending parallel to the axis of said assembly beyond the outer periphery of the brake mechanism and connected at opposite ends to said frame, and means connecting said rigid means to said rigid member for holding said rigid means and thereby said brake cylinder means and non-rotatable brake elements against rotation but providing for vertical movement of said frame relative to said brake mechanism.

8. A disk brake mechanism for a wheel and axle assembly on a railway vehicle having a journal box on said axle adjacent each of said wheels and having a truck frame mounted on the journal boxes, said brake mechanism comprising annular rotatable and non-rotatable friction brake elements operative upon frictional interengagement to effect braking of said assembly, annular brake cylinder means for actuating said brake elements, said brake elements and brake cylinder means being located between said journal boxes and encircling said axle in concentric relation therewith, means securing said rotatable brake elements to said assembly for rotation therewith, a plurality of rigid means extending parallel to the axis of said axle and spaced from each other about said axle, and secured at opposite ends to said journal boxes, said brake cylinder means being carried by said rigid means, said non-rotatable brake elements being carried by said rigid means and being movable thereon axially of said assembly, a beam extending transversely of said frame over said brake mechanism and secured at opposite ends to said frame over said journal boxes, and a vertically extending torque arm connected to said rigid means and having a sliding connection with said beam in a vertical direction securing said brake cylinder means and non-rotatable brake elements against rotation and providing for vertical movement of said frame relative to said brake mechanism.

9. A disk brake mechanism for a wheel and axle assembly of a railway vehicle having a pair of journal boxes carried by said assembly one adjacent the inner face of each of said wheels and having frame side members located about said journal boxes and provided with oppositely arranged pedestal legs slidably mounted on said journal boxes and having a cap connecting the lower ends of the pedestal legs below each journal box, said brake mechanism comprising a pile of interleaved annular rotatable and non-rotatable friction brake elements and an annular brake cylinder device for actuating said elements into frictional interengagement to effect braking of said assembly, said brake elements and brake cylinder device being located between said journal boxes and encircling said axle in concentric relation therewith, means securing said rotatable brake elements to said assembly for rotation therewith, a plurality of rigid members arranged parallel to the axis of said axle and extending between and secured at opposite ends to said journal boxes, means securing said brake cylinder means to said rigid members, said non-rotatable brake elements being secured to said rigid members and being movable axially thereon, a torque arm secured to said rigid members and depending therefrom, a beam extending lengthwise of said assembly and rigidly secured at its opposite ends to the caps connecting the pedestal legs below each of said journal boxes, said torque arm being connected to said beam for securing said non-rotatable brake elements against rotation and providing for vertical movement of said frame side members relative to said brake mechanism.

10. A disk brake mechanism for a wheel and axle assembly of a railway vehicle having two journal boxes mounted on the axle one adjacent each of said wheels, said brake mechanism comprising a pile of interleaved annular rotatable and non-rotatable friction brake elements operative upon frictional interengagement to effect braking of said assembly, annular brake cylinder means for actuating said brake elements, said brake elements and brake cylinder means being located between said journal boxes and encircling said axle in coaxial relation therewith, means securing said rotatable brake elements to said assembly for rotation therewith, each of said journal boxes having a plurality of arms extending substantially radially therefrom and which are spaced from each other, a plurality of rigid beams arranged parallel to the axis of said assembly beyond the outer peripheries of said rotatable brake elements and secured at opposite ends to said arms of said journal boxes, said beams supporting said non-rotatable brake elements and providing for axial movement thereof, means securing said brake cylinder means to said beams, and means connecting said beams to a non-rotatable part of the vehicle other than said journal boxes for securing same and thereby said non-rotatable brake elements against rotation.

11. A brake mechanism for a wheel and axle assembly of a railway vehicle having a pair of journal boxes carried by said axle one adjacent the inner face of each of said wheels, and a frame side member carried by each of said journal boxes, said brake mechanism comprising a pile of interleaved annular rotatable and non-rotatable friction brake elements operative upon frictional interengagement to effect braking of said assembly, annular brake cylinder means for actuating said brake elements, said brake cylinder means and brake elements encircling said axle between said journal boxes in coaxial relation with said assembly, a plurality of beams extending parallel to the axis of said assembly beyond the outer peripheries of said rotatable brake elements and carrying said non-rotatable brake elements, support means projecting from said journal boxes for carrying the opposite ends of said beams, cushion means interposed between said support means and the ends of said beams, means securing said beams to said support means, means securing said brake cylinder means to said beams, and means independent of said support means connecting said beams to said side frame members for holding said brake cylinder means and non-rotatable brake elements against turning.

12. A brake mechanism for a wheel and axle assembly of a railway vehicle having a pair of journal boxes carried by said axle one adjacent the inner face of each of said wheels, and a frame side member carried by each of said journal boxes, said brake mechanism comprising a pile of interleaved annular rotatable and non-rotatable friction brake elements operative upon frictional interengagement to effect braking of said assembly, annular brake cylinder means for actuating said brake elements, said brake cylinder means and brake elements encircling said axle between said journal boxes in coaxial relation with said assembly, a rigid member at each of the opposite sides of said assembly extending from one journal box to the other parallel to the axis thereof, means securing the opposite ends of both rigid members to said journal boxes, said rigid members supporting said non-rotatable brake elements, means securing said brake cylinder means to said rigid members, and means securing said rigid members and thereby said non-rotatable brake elements and brake cylinder means against rotation.

13. A brake mechanism for a wheel and axle assembly of a railway vehicle having a pair of journal boxes carried by said axle one adjacent the inner face of each of said wheels, and a frame side member carried by each of said journal boxes, said brake mechanism comprising a pile of interleaved annular rotatable and non-rotatable friction brake elements operative upon frictional interengagement to effect braking of said assembly, annular brake cylinder means for actuating said brake elements, said brake cylinder means and brake elements encircling said axle between said journal boxes in coaxial relation with said assembly, a rigid member at each of the opposite sides of said assembly extending from one journal box to the other parallel to the axis thereof, means securing the opposite ends of both rigid members to said journal boxes, said rigid members supporting said non-rotatable brake elements, means securing said brake cylinder means to said rigid members, said brake mechanism having a depending torque bar connected with said non-rotatable brake elements for holding same against rotation, and a rigid member extending transversely of said vehicle below said journal boxes and connected at its opposite ends to said side frame members, said torque bar having a connection with said rigid member for holding said torque bar against turning around said axle and providing for vertical movement of said rigid member with said side frame members relative to said journal boxes.

14. A brake mechanism for a wheel and axle assembly of a railway vehicle having a pair of journal boxes carried by said axle one adjacent the inner face of each of said wheels, and a frame side member carried by each of said journal boxes, said brake mechanism comprising a pile of interleaved annular rotatable and non-rotatable friction brake elements operative upon frictional interengagement to effect braking of said assembly, annular brake cylinder means for actuating said brake elements, said brake cylinder means and brake elements encircling said axle between said journal boxes in coaxial relation with said assembly, said journal boxes having on each of the opposite sides of said assembly an outwardly extending wedge shaped lug, a rigid member at each of the opposite sides of said assembly extending parallel to the axis thereof and having its opposite ends shaped to fit the lugs on said journal boxes, means rigidly securing the opposite ends of said rigid members to said journal boxes, said non-rotatable brake elements having means in engagement with said rigid members for supporting said non-rotatable brake elements, means securing said brake cylinder means to said rigid members, and means connecting said rigid members with said frame for securing same and thereby said non-rotatable brake elements against rotation.

15. A disk brake mechanism for a wheel and axle assembly of a railway vehicle having two journal boxes mounted on the axle one adjacent the inner face of each of said wheels and having a side frame member carried by each of said journal boxes, said brake mechanism comprising a pile of interleaved annular rotatable and non-rotatable brake elements operative upon frictional interengagement to effect braking of said assembly, means securing the rotatable brake elements to rotate with said assembly, a plurality of beams extending parallel to the axis of said axle and arranged in spaced relation around the axle beyond the outer peripheral surfaces of said rotatable brake elements, said beams being supported at opposite ends of said journal boxes, means securing said brake cylinder device to said beams for supporting same, means securing the non-rotatable brake elements to said beams for supporting same and for holding same against turning relative to said beams and providing for axial movement thereof relative to said beams, a rigid member connected to said side frame members, and a torque arm rigidly connected to said brake cylinder means, and having a connection with said rigid member for securing said brake cylinder means and thereby said beams and non-rotatable elements against rotation, the connection between said torque arm and rigid member providing for vertical movement of said rigid member with said side frame members relative to said journal boxes.

16. A disk brake mechanism for a vehicle wheel, comprising, an annular rotatable friction brake element secured to rotate with said wheel, an annular non-rotatable friction brake element arranged in coaxial relation with said rotatable brake element and adapted to be moved axially into frictional braking engagement with said rotatable brake element, means for actuating said non-rotatable brake element, and means for suporting said non-rotatable brake element and for holding said non-rotatable brake element against rotation comprising a rigid member disposed at each of the opposite sides of said nonrotatable brake element and extending parallel to the axis of said elements, said non-rotatable brake element having connections with said rigid member providing for axial movement of the non-rotatable element for braking and also radial movement of the element in the direction of either of said rigid members, and resilient means associated with each rigid member acting on said non-rotatable brake element urging same in the direction of the axis of the element.

17. A disk brake mechanism for a vehicle wheel, comprising, a pile of interleaved coaxially arranged annular rotatable and non-rotatable friction brake elements operative upon frictional interengagement to effect braking of said wheel, means for actuating said brake elements, means securing the rotatable brake elements to rotate with said wheel, and means for supporting the non-rotatable brake elements and for securing same against rotation comprising two rigid members spaced from each other beyond the outer peripheral surfaces of said rotatable brake elements and extending parallel to the axis of said elements, the connection between said rigid members and non-rotatable brake elements providing for axial and radial movement of said non-rotatable brake elements, and resilient pressure exerting means associated with each rigid member acting on said non-rotatable elements for urging same radially in the direction of their axes for resiliently maintaining said non-rotatable brake elements in braking alignment with said rotatable brake elements and providing for limited radial movement of said non-rotatable brake elements.

18. An annular brake cylinder means comprising a plurality of independent cylindrical brake cylinder casings equally spaced from each other in a circle and with their axes arranged parallel to each other, a brake cylinder piston in each of said casings adapted to be operated by fluid under pressure for applying brakes, two annular end plates one engaging each of the opposite ends of said casings, and means rigidly clamping said end plates against opposite ends of said casings for supporting said casings.

19. An annular brake cylinder means for applying the brakes on a vehicle, comprising, a plurality of independent, cylindrical brake cylinder casings arranged in a circle and equally spaced from each other with their axes in parallel relation, a brake cylinder piston in each of said casings adapted to be operated by fluid under pressure for applying brakes, two annular end plates one arranged at each of the opposite ends of said casings and having bores aligned with the ends of said casings for receiving same, shoulders on the opposite ends of said casings for engaging adjacent faces of said end plates, and means rigidly clamping said end plates to each other and thereby against the opposite ends of said casings for supporting said casings.

20. An annular brake cylinder means for applying the brakes on a vehicle comprising a plurality of independent cylindrical casings spaced from each other around a circle with their axes in parallel relation and each having a piston bore open at one end of the casing, a piston in each of said bores having at its outer face a non-pressure chamber and having at its opposite face a pressure chamber to which fluid under pressure is adapted to be supplied to effect operation of said piston to apply brakes, pipes connecting the pressure chambers in each adjacent pair of said brake cylinder casings, a fluid pressure supply pipe connected to one of said pressure chambers, a pair of annular end plates one disposed at each of the opposite ends of said casings and having openings to receive said casings and bearing against the ends of said casings, and means rigidly clamping said end plates together and thereby against the opposite ends of said casings for supporting same.

21. A disk brake mechanism for a vehicle wheel, comprising, two annular rotatable friction brake elements spaced apart and secured to turn with said wheel, an annular non-rotatable friction brake element disposed to frictionally engage each of the adjacent faces of the rotatable brake elements, an annular double acting brake cylinder means interposed between the two non-rotatable brake elements in coaxial relation therewith and adapted to actuate same, a plurality of bars arranged around the axis of said elements beyond said rotatable brake elements and connected with said non-rotatable brake elements for supporting same and for holding same against rotation, said brake cylinder means comprising a plurality of separate cylindrical brake cylinder casings spaced from each other in a circle around and in coaxial relation with the axes of said elements, a pair of oppositely moving pistons in each casing operatively connected to the non-rotatable brake elements at both ends of the brake cylinder means for actuating said non-rotatable elements, each pair of pistons having a pressure chamber therebetween to receive fluid under pressure for actuating same, two annular end plates one disposed at each of the opposite ends of said casings, means clamping said end plates to said casings for supporting said casings, and means connecting said end plates to said bars for supporting said brake cylinder means.

22. A disk brake mechanism for a vehicle wheel, comprising, two annular rotatable friction brake elements spaced apart and secured to turn with said wheel, an annular non-rotatable friction brake element disposed to frictionally engage each of the adjacent faces of the rotatable brake elements, an annular double acting brake cylinder means interposed between the two non-rotatable brake elements in coaxial relation therewith and adapted to actuate same, a plurality of bars arranged around the axis of said elements beyond said rotatable brake elements and connected with said non-rotatable brake elements for supporting same and for holding same against rotation, said brake cylinder means comprising a plurality of separate cylindrical brake cylinder casings spaced from each other in a circle around and in coaxial relation with the axes of said elements, a pair of oppositely moving pistons in each casing operatively connected to the non-rotatable brake elements at both ends of the brake cylinder means for actuating said non-rotatable elements, each pair of pistons having a pressure chamber therebetween to receive fluid under pressure for actuating same, two annular end plates one disposed at each of the opposite ends of said casings, means clamping said end plates to said casings for supporting said casings, means connecting said end plates to said bar for supporting said brake cylinder means, a torque arm connected to both of said end plates, and means connected with said torque arm for holding said end plates and thereby said bars and non-rotatable brake elements against rotation.

23. A brake mechanism for a wheel comprising a set of annular rotatable friction brake elements secured to rotate with said wheel, a set of annular non-rotatable frictional brake elements interleaved and arranged in coaxial relation with said rotatable brake elements, the brake element at one end of the pile being a rotatable brake element fixed against axial movement and all other brake elements being movable axially in the direction of said fixed brake element into frictional interengagement to effect braking of said wheel, means for actuating said brake elements into frictional interengagement, means connected to said non-rotatable brake elements supporting same and securing same against rotation, means for moving the axially movable brake elements in the direction away from the fixed rotatable brake element and out of contact with each other to brake release positions, a fixed stop for each of the axially movable brake elements engageable thereby in its release position to define said position, and a slot in the axially movable brake element located at the side of each stop opposite the fixed rotatable brake element, aligned with the last named stop to provide for movement of the last named brake element over the last named stop in the direction of the fixed rotatable brake element.

24. A brake mechanism for a wheel comprising a set of annular rotatable friction brake elements secured to rotate with said wheel, a set of annular non-rotatable frictional brake elements interleaved and arranged in coaxial relation with said rotatable brake elements, the brake element at one end of the pile being a rotatable brake element fixed against axial movement and all other brake elements being movable axially in the direction of said fixed brake element into frictional interengagement to effect braking of said wheel, means for actuating said brake elements into frictional interengagement, means connected to said non-rotatable brake elements supporting same and securing same against rotation, means for moving the axially movable brake elements in the direction away from the fixed rotatable brake element and out of contact with each other to brake release positions, a fixed stop for each of the axially movable brake elements engageable thereby in its release position to define said position, the release stops for one of said sets of brake elements comprising fingers engageable thereby, the brake elements in the one set at the side of each finger opposite the fixed rotatable brake element having a slot aligned with the said finger providing for movement of the brake element from one side to the other of said finger.

25. A brake mechanism for a wheel, comprising, a sleeve secured to rotate with said wheel, a pile of annular rotatable and non-rotatable axially movable brake elements encircling said sleeve in coaxial relation therewith, another rotatable friction brake element at one end of said pile arranged in coaxial relation therewith and secured against axial movement, means connecting the other rotatable brake elements to said sleeve for rotation therewith, means supporting said non-rotatable brake elements and for holding same against rotation, means operative on the end of said pile of brake elements opposite the fixed rotatable brake element for effecting movement of the axially movable brake elements against said fixed rotatable brake element to effect braking of said wheel, means operative to move the brake elements in a direction away from said fixed rotatable brake element to release positions out of contact with each other, means for defining the release positions of said non-rotatable brake elements, and means for defining the release positions of said axially movable rotatable brake elements comprising fingers projecting from said sleeve for engagement by the axially movable rotatable brake elements in their release positions, the rotatable brake element at the side of each finger opposite the fixed rotatable brake element having a slot aligned with the last named finger provided for movement of the last named rotatable brake element over the last named finger in the direction of the fixed rotatable brake element.

26. A brake mechanism for a wheel, comprising, a plurality of interleaved annular rotatable and non-rotatable friction brake elements arranged in coaxial relation with each other, the brake element at one end of said pile being secured against axial movement and all other brake elements being capable of axial movement in the direction of the fixed rotatable brake element to provide frictional interengagement between said elements for effecting braking of said wheel, and in the opposite direction out of contact with each other to brake release positions, means securing the rotatable brake elements to rotate with said wheel and including means engageable by the axially movable rotatable brake elements in their release positions for defining said pistons, rigid members extending parallel to the axis of said wheel and spaced from each other around the outer periphery of said rotatable brake elements, means securing said rigid members against turning about the axis of said wheel, said non-rotatable brake elements having slots in which said rigid members are disposed for supporting said non-rotatable brake elements and providing for axial movement thereof, and stop means associated with one or more of said rigid members having fingers engageable by said non-rotatable brake elements in their brake release positions for defining same, the non-rotatable brake element at the side of each finger opposite the fixed rotatable brake element having a slot aligned with the last named finger to provide for movement of the last named non-rotatable brake element in the direction of the fixed rotatable brake element across the last named finger.

27. A brake mechanism for a wheel of a railway vehicle, comprising, a pile of interleaved annular rotatable and non-rotatable friction brake elements arranged in coaxial relation with said wheel, an annular brake cylinder means arranged in coaxial relation with said brake elements at one end of said pile and operative to move said brake elements axially into frictional interengagement to effect braking of said wheel, means operative upon release of said brake cylinder means to move said brake elements out of contact with each other to brake release positions, means securing the rotatable brake elements to rotate with said wheel and including stops for defining the release positions of said rotatable brake elements, means supporting the non-rotatable brake elements, means associated with said brake cylinder means for defining the release position of the adjacent non-rotatable brake element, and fixed means having fingers disposed to be engaged by the other non-rotatable brake elements in their release positions for defining same, the non-rotatable brake element on the side of each of said fingers adjacent the brake cylinder device being provided with a slot for movement past the last named finger upon movement of the pile of brake elements into frictional interengagement.

28. A brake mechanism for a vehicle wheel, comprising, a pile of interleaved coaxially arranged annular rotatable and non-rotatable friction brake elements movable axially in one direction into frictional interengagement to effect braking of said wheel and movable in the opposite direction out of contact with each other to release positions for releasing the brakes on said wheel, means for actuating said brake elements into frictional interengagement, release means for moving said brake elements to their release positions and stop means engageable by each of said elements in its release position for defining same, the release means for said rotatable brake elements comprising a release spring having a direct connection with one of said rotatable brake elements to urge same into engagement with its respective stop means, and having a resilient connection with each of the other rotatable brake elements for resiliently urging same into engagement with their respective stop means, the connection between said release spring and each of said rotatable brake elements being independent of the connections with the other rotatable brake elements.

29. A brake mechanism for a vehicle wheel, comprising, a pile of interleaved coaxially arranged annular rotatable and non-rotatable friction brake elements movable axially in one direction into frictional interengagement to effect braking of said wheel and movable in the opposite direction out of contact with each other to release positions for releasing the brakes on said wheel, means for actuating said brake elements into frictional interengagement, release means for moving said brake elements to their release positions and stop means engageable by each of said elements in its release position for defining same, the release means for said non-rotatable brake elements comprising a release spring having a direct connection with one of said non-rotatable brake elements to urge same into engagement with its respective stop means, and having a resilient connection with each of the other non-rotatable brake elements for resiliently urging same into engagement with their respective stop means, the connection between said release spring and each of said non-rotatable brake elements being independent of the connections with the other rotatable brake elements.

30. A brake mechanism for a vehicle wheel, comprising, a pile of interleaved coaxially arranged annular rotatable and non-rotatable friction brake elements movable axially in one direction into frictional interengagement to effect braking of said wheel and movable in the opposite direction out of contact with each other to release positions for releasing the brakes on said wheel, means for actuating said brake elements into frictional interengagement, release means for moving said brake elements to their release positions and stop means engageable by each of said elements in its release position for defining same, the release means for said rotatable brake elements comprising a release spring having a direct connection with one of said rotatable brake elements to urge same into engagement with its respective stop means, and having a resilient connection with each of the other rotatable brake elements for resiliently urging same into engagement with their respective stop means, the release means for said non-rotatable brake elements also comprising a release spring having a direct connection with one of said non-rotatable brake elements for urging same into contact with its stop means and a resilient connection with each of the other non-rotatable brake elements for resiliently urging same into contact with its respective stop means, the resilient connections between said release springs and the respective brake elements providing for adjustment of said brake elements relative to each other in accordance with the relative disposition of said stop means, and the connections between both of said release springs and each of the respective brake elements controlled thereby being independent of the connections with the other brake elements.

31. A brake mechanism for a vehicle wheel, comprising, a set of annular rotatable friction braking elements secured to rotate with said wheel, a set of annular non-rotatable friction braking elements interleaved with said rotatable brake elements, actuating means operative on one end of the pile of brake elements to move said brake elements axially in the direction of the opposite end of the pile into frictional interengagement to brake said wheel, release mechanism for moving said brake elements axially in the opposite direction to release positions for releasing the brakes on said wheel, and stops for defining said release positions, said release mechanism for one set of brake elements comprising release means slidably mounted in the brake elements of said one set from said opposite end of said pile and having a direct connection with one brake element in the said one set and a resilient connection with the other brake element or elements in the said one set for moving same in the direction of their release stops, and a spring acting on said release means for actuating same.

32. A brake mechanism for a vehicle wheel, comprising, a set of annular rotatable friction braking elements secured to rotate with said wheels, a set of annular non-rotatable friction braking elements interleaved with said rotatable brake elements, actuating means operative on one end of the pile of brake elements to move said brake elements axially in the direction of the opposite end of the pile into frictional interengagement to brake said wheel, release mechanism for moving said brake elements axially in the opposite direction to release positions for releasing the brakes on said wheel, and stops for defining said release positions, each of the brake elements in one of said sets having an opening, the several openings being aligned and stepped up in size in the direction of said opposite end of said pile, said release mechanism for said one set of brake elements comprising sleeve-like means slidably mounted in said openings from said opposite end of said pile and having a direct connection with one brake element in said one set for moving same against its release stop, a spring associated with said release means and operative thereby upon each of the other elements in said set for moving it against its release stop, and a release spring acting on said sleeve-like means for actuating same.

33. A brake mechanism for a vehicle wheel, comprising, a set of annular rotatable friction braking elements secured to rotate with said wheels, a set of annular non-rotatable friction braking elements interleaved with said rotatable brake elements, actuating means operative on one end of the pile of brake elements to move said brake elements axially in the direction of the opposite end of the pile into frictional interengagement to brake said wheel, release mechanism for moving said brake elements axially in the opposite direction to release positions for releasing the brakes on said wheels, and stops for defining said release positions, each of the brake elements in one of said sets having an opening, the several openings being aligned and stepped up in size in the direction of said opposite end of said pile, said release mechanism for said one set of brake elements comprising a release bolt extending through said openings, and having a sliding fit with the smallest opening, a sleeve for each of the other openings having a sliding fit therein and slidably carried by said bolt, each of said sleeves having an annular collar for engaging the brake element carrying same on the face adjacent said opposite end of said pile, and the said collars on the sleeves in the intermediate brake elements being of the same size as the adjacent larger sleeves for entering the openings normally occupied thereby in effecting an application of brakes, means connecting said bolt directly to one of said sleeves, means including a spring connecting said bolt directly to another of said sleeves, and means including a spring connecting said bolt directly to the brake element having the opening of smallest size for thereby rendering said bolt operative to move the one brake element into engagement with its release stop and to resiliently urge the other brake elements in the set into engagement with their release stops, and a release spring acting on said bolt for actuating same.

34. A brake mechanism for a vehicle wheel, comprising, a set of annular rotatable friction braking elements secured to rotate with said wheels, a set of annular non-rotatable friction braking elements interleaved with said rotatable brake elements, actuating means operative on one end of the pile of brake elements to move said brake elements axially in the direction of the opposite end of the pile into frictional interengagement to brake said wheel, release mechanism for moving said brake elements axially in the opposite direction to release positions for releasing the brakes on said wheel, and stops for defining said release positions, each of said brake elements in one set having an opening, the several openings being aligned and stepped up in size in the direction of said opposite end of said pile, said release mechanism for said one set of brake elements comprising a release bolt extending through said openings, a sleeve slidably mounted in each of said openings and slidably mounted on said bolt, each of said sleeves having on one end a collar of greater size for engaging the element to move it to its release position, each of the said collars located between two adjacent brake elements being of the same size as the adjacent sleeve of greater size for entering the said opening of greater size in effecting an application of brakes, means connecting said bolt directly to one of said collars and means including a spring connecting said bolt to each of the other collars for thereby rendering said bolt operative to move the one brake element into engagement with its release stop and to resiliently urge the other brake element or elements into engagement with their release stops, and a release spring acting on said bolt for actuating same.

35. A brake mechanism for a rotatable member, comprising, an annular double acting brake cylinder device, an annular rotatable brake element at each of the opposite ends of said brake cylinder device secured to rotate with said rotatable member, an annular non-rotatable brake element interposed between each of said rotatable brake elements and the opposite ends of said brake cylinder device, said brake cylinder device and brake elements being disposed in coaxial relation, said brake cylinder device being operative in opposite directions to effect movement of said non-rotatable brake elements axially into frictional engagement with the said rotatable brake elements for braking said member, and release means operative upon the release of said brake cylinder device for moving said non-rotatable brake elements out of frictional engagement with said rotatable brake elements and to release positions, said release means comprising for each of the non-rotatable brake elements a plurality of bolts arranged around the axis of said brake mechanism on a circle of less diameter than the outer peripherial surface of said brake cylinder device, each of said bolts being slidably mounted in said brake cylinder device and having an operating connection with the respective non-rotatable brake element, and a spring for each of said bolts carried by said brake cylinder device within the contour thereof and acting on the bolt for moving the connected non-rotatable brake element in the direction of said brake cylinder device to its release position.

36. A brake mechanism for a rotatable member, comprising, an annular double acting brake cylinder means encircling said member in concentric relation therewith, a pile of brake elements disposed at each side of said brake means in coaxial relation therewith and including a plurality of annular rotatable friction brake elements secured to rotate with said member and a plurality of annular non-rotatable friction brake elements interleaved with said rotatable brake elements, said brake cylinder means being operative in opposite directions to move the brake elements in both of said piles into frictional interengagement to effect braking of said member, and release means for the rotatable and non-rotatable brake elements in each of said piles operative upon release of said brake cylinder means to effect movement of the axially movable brake elements in the direction of said brake cylinder means to release positions out of frictional interengagement, the release means for the non-rotatable brake elements in each pile comprising a plurality of release bolts carried by said brake cylinder means and spaced from each other around a circle concentric with the axis of the mechanism and of less diameter than the outer periphery of said brake cylinder device, a release spring for each bolt disposed between the opposite ends of said brake cylinder device and acting on the bolt for moving same in the direction of the brake cylinder device, means connecting said bolts with the non-rotatable brake elements in the respective piles for rendering the springs effective to move the connected non-rotatable brake elements to their release positions, and the release means for the rotatable brake elements in each pile comprising a plurality of bolts carried by said member and spaced from each other around said member on a circle concentric to and of smaller diameter than that on which the bolts for the non-rotatable brake elements are arranged, a spring for each of the last named bolts carried by said member and acting on the bolt for urging the rotatable brake elements in the direction of said brake cylinder device, the last named springs being disposed between planes including the opposite ends of said brake cylinder device, and means operatively connecting each of the last named bolts to the rotatable brake elements in the respective piles for urging same to their release positions.

37. A brake mechanism for a rotatable member, comprising, an annular one piece ring-like rotatable frictional brake element secured to said member for rotation therewith, an annular ring-like non-rotatable brake element comprising a central steel portion and a brake shoe secured to said central portion against the face thereof adjacent said rotatable brake element, said brake shoe being arranged to frictionally engage said rotatable brake element to brake said member, an annular brake cylinder device arranged at the opposite face of the central portion of said non-rotatable brake element and operative thereon to effect movement of said non-rotatable brake element into frictional engagement with said rotatable brake element, a plurality of beams arranged parallel to the axis of said assembly and spaced from each other supporting said brake cylinder device and non-rotatable brake element and providing for axial movement of said non-rotatable brake element thereon, said non-rotatable brake element comprising a plurality of arcuate shaped sections arranged in end to end abutting relation, and straps overlapping the abutting portions of the different sections of said non-rotatable brake element and welded thereto to form a rigid annular brake element.

38. A brake mechanism for a rotatable member, comprising, an annular one piece ring-like rotatable frictional brake element secured to said member for rotation therewith, an annular ring-like non-rotatable brake element comprising a central steel portion and a brake shoe secured to said central portion against the face thereof adjacent said rotatable brake element, said brake shoe being arranged to frictionally engage said rotatable brake element to brake said member, an annular brake cylinder device arranged at the opposite face of the central portion of said non-rotatable brake element and operative thereon to effect movement of said non-rotatable brake element into frictional engagement with said rotatable brake element, a plurality of beams arranged parallel to the axis of said assembly and spaced from each other supporting said brake cylinder device and non-rotatable brake element and providing for axial movement of said non-rotatable brake element thereon, said non-rotatable brake element comprising a plurality of arcuate shaped sections arranged in end to end abutting relation, the lines of division between the different arcuate sections of said non-rotatable brake element being arranged between said beams, and straps overlapping the abutting portions of said sections and welded thereto providing a solid annular brake element, the ends of said straps engaging said beams for increasing the bearing surface of said non-rotatable brake element on said beams.

39. A brake mechanism for a rotatable member, comprising, an annular one piece ring-like rotatable frictional brake element secured to said member for rotation therewith, an annular ring-like non-rotatable brake element comprising a central steel portion and a brake shoe secured to said central portion against the face thereof adjacent said rotatable brake element, said brake shoe being arranged to frictionally engage said rotatable brake element to brake said member, an annular brake cylinder device arranged at the opposite face of the central portion of said non-rotatable brake element and operative thereon to effect movement of said non-rotatable brake element into frictional engagement with said rotatable brake element, a plurality of beams arranged parallel to the axis of said assembly and spaced from each other supporting said brake cylinder device and non-rotatable brake element and providing for axial movement of said non-rotatable brake element thereon, said non-rotatable brake element comprising a plurality of arcuate shaped sections arranged in end to end abutting relation, straps overlapping the lines of juncture of the different sections of said non-rotatable brake element and welded thereto providing a solid annular brake element, said lines of juncture being out of alignment with said beams, and other straps welded to the opposite faces of said central portion and engaging said beams to provide increased bearing surface between said non-rotatable brake element and said beams.

40. A brake mechanism for a rotatable member, comprising, an annular one piece ring-like rotatable frictional brake element secured to said member for rotation therewith, an annular ring-like non-rotatable brake element comprising a central steel portion and a brake shoe secured to said central portion against the face thereof adjacent said rotatable brake element, said brake shoe being arranged to frictionally engage said rotatable brake element to brake said member, an annular brake cylinder device arranged at the opposite face of the central portion of said non-rotatable brake element and operative thereon to effect movement of said non-rotatable brake element into frictional engagement with said rotatable brake element, a plurality of beams arranged parallel to the axis of said assembly and spaced from each other supporting said brake cylinder device and non-rotatable brake element and providing for axial movement of said non-rotatable brake element thereon, said non-rotatable brake element comprising a plurality of arcuate shaped sections arranged in end to end abutting relation to form an annulus, parts overlapping the abutting portions of said different sections and welded thereto providing a solid annular ring-like non-rotatable brake element, said brake cylinder device also comprising a plurality of sections arranged in end to end abutting relation, and removable means rigidly securing the different sections of said brake cylinder device in such relation.

JOSEPH C. McCUNE.
GEORGE K. NEWELL.